United States Patent
Kitamura et al.

(10) Patent No.: US 6,487,015 B2
(45) Date of Patent: *Nov. 26, 2002

(54) DIFFRACTION GRATING HAVING MULTIPLE GRATINGS WITH DIFFERENT CYCLES FOR GENERATING MULTIPLE BEAMS AND OPTICAL PICKUP USING SUCH DIFFRACTION GRATING

(75) Inventors: Kazuya Kitamura, Tenri (JP); Yukio Kurata, Tenri (JP); Takeshi Yamaguchi, Sakai (JP); Tetsuo Ueyama, Nara (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/407,088

(22) Filed: Sep. 28, 1999

(65) Prior Publication Data

US 2002/0122253 A1 Sep. 5, 2002

(30) Foreign Application Priority Data

Sep. 28, 1998 (JP) .............................. 10-273246
Sep. 30, 1998 (JP) .......................... 10-276785

(51) Int. Cl.$^7$ ............................................. G02B 27/64
(52) U.S. Cl. .................. 359/558; 359/556; 359/569; 359/575; 359/15; 369/44.14
(58) Field of Search ................................ 359/566, 569, 359/575, 15, 16, 19; 369/44.14, 1.12

(56) References Cited

U.S. PATENT DOCUMENTS

| 4,768,183 | A |   | 8/1988  | Ohnishi et al. |           |
|-----------|---|---|---------|----------------|-----------|
| 4,886,341 | A |   | 12/1989 | Oishi et al.   |           |
| 5,475,670 | A | * | 12/1995 | Hamada et al.  | 369/112   |
| RE35,332  | E | * | 9/1996  | Nagahama et al.| 359/19    |
| 5,881,035 | A | * | 3/1999  | Ueyama         | 369/44.23 |

FOREIGN PATENT DOCUMENTS

| EP | A5-264923   | 10/1993 |
| EP | 0 829 863 A2 | 3/1998 |
| JP | A 58-125244 | 7/1983  |
| JP | A1-248329   | 10/1989 |
| JP | A1-269239   | 10/1989 |
| JP | 7-153104    | 6/1995  |
| JP | A7-302435   | 11/1995 |

* cited by examiner

*Primary Examiner*—Cassandra Spyrou
*Assistant Examiner*—Fayez Assaf
(74) *Attorney, Agent, or Firm*—Birch, Stewart, Kolasch & Birch, LLP

(57) ABSTRACT

A diffraction grating for generating a plurality of beams includes a plurality of gratings. The plurality of gratings are formed to have an axis of symmetry perpendicular to the direction in which a beam is divided on a surface of diffraction grating and include at least two gratings having different fundamental cycles. The plurality of gratings are formed such that they have an axis of symmetry perpendicular to the direction in which a beam is divided on a surface of the diffraction grating, for generating a plurality of beams. The fundamental cycle increases as a function of the distance from the axis of symmetry, and therefore aberration in the periphery of scattering light may be reduced.

13 Claims, 18 Drawing Sheets

BEAM DIVIDING DIRECTION

GRATING CYCLE : pn

BEAM DIVIDING DIRECTION

GRATING CYCLE : pn 0.2λ

0.2λ

0.2λ

DIFFRACTION GRATING HAVING MULTIPLE GRATINGS WITH DIFFERENT CYCLES FOR GENERATING MULTIPLE BEAMS AND OPTICAL PICKUP USING SUCH DIFFRACTION GRATING

BACKGROUND OF THE INVENTION

1. Field of the Invention

The present invention relates generally to diffraction gratings for generating a plurality of beams and multi-beam pickups for recording/reproducing simultaneously to/from a plurality of tracks on an optical recording medium. The invention relates particularly to a diffraction grating having a plurality of gratings with different cycles for generating a plurality of beams and an optical pickup using such a diffraction grating.

2. Description of the Background Art

Various optics-related techniques have been researched, developed and reduced to practice in a variety of fields including communication, measurement and processing, because they permit operations at high a frequencies (high speeds), spatial information processing, phase processing and the like.

Among such techniques, the use of diffraction gratings and holograms as elements for selecting wavelengths, deflecting light, and generating a plurality of beams is known. For example, a diffraction grating in a spectroscope is used for separating a light component with a different wavelength in an incident light beam, and has a constant grating cycle.

Japanese Patent Laying-Open No. 5-264923 proposes a hologram scanner using a hologram for deflecting and collecting light as an application to a laser printer. According to this document, a light beam emitted from a semiconductor laser as an optical source is allowed to come into a plurality of scan holograms formed on a hologram disc. A light beam diffracted and deflected by the scan holograms is used to form an image on a scanning surface (photoreceptor drum), and the deflection angle of the diffracted light beam is changed by the rotation of the hologram disc for scanning. In order to correct characteristics on the scanning surface such as astigmatism and curvature of field, a grating pitch for the scan hologram is two-dimensionally modulated.

There is known such an information recording/reproducing apparatus in which an optical information recording medium (optical disc) is used, a plurality of beams are generated in an optical pickup for reading information, and the plurality of beams are directed at the optical disc at a time to obtain a signal. In the optical pickup, a diffraction grating is used to generate a plurality of beams (see Japanese Patent Laying-Open No. 1-269239 for example). Such a diffraction grating used for an optical pickup will be now described in detail.

First Conventional Example

Japanese Patent Laying-Open No. 1-269239 discloses an optical pickup including a diffraction grating for dividing a beam, a hologram element for dividing light for RES (Radial Error Signal) and FES (Focus Error Signal), and a laser source as they are integrally formed.

FIG. 1 is a view of the 3-beam optical pickup described above. Divergent light emitted from a semiconductor laser 112 as an optical source is divided into a plurality of beams by a diffraction grating 113, each transmitted through hologram element 114 as the zeroth-order diffracted light and comes into a collimator lens 115. The beams formed into parallel rays by collimator lens 115 are collected into a small enough spot on a disc 117 by an objective lens 116, and reflected as an optical beam reflecting information on disc 117. The reflected light is passed through objective lens 116 and collimator lens 115 and divided into the zeroth-order diffracted light beam and the first-order diffracted light beam by hologram element 114. The first-order diffracted light beam is allowed to come into an internal light receiving portion 118 including an RES light receiving portion, an FES light receiving portion and an RF (Radio Frequency) signal light receiving portion.

Herein, semiconductor laser 112, diffraction grating 113, hologram element 114 and internal light receiving portion 118 are built integrally as a hologram laser unit 119. Diffraction grating 113 divides a light beam into three beams, the zeroth-order diffracted light beam and the ±first-order diffracted light beams, and the zeroth-order light beam is used as an RF signal and an FES, while the ±first-order diffracted light beams are used as an RES. Therefore, the tracking employs the 3-beam method.

Second Conventional Example

A multi-beam optical pickup is proposed by which an optical recording medium is irradiated with a plurality of beams, which are used to record/reproduce information simultaneously to/from a plurality of tracks on the optical recording medium (Japanese Patent Laying-Open No. 1-248329).

The multi-beam optical pickup will be now described in conjunction with related figures. FIG. 2 is a view of an optical system. A light beam emitted from a semiconductor laser 102 as an optical source is formed into parallel light with a collimator lens 104, then let into a diffraction grating 103 and divided into a plurality of beams. Then, each of the beams is passed through a beam splitter 105, collected into an optical spot small enough on a disc 107 by an objective lens 106 and reflected and passed through objective lens 106 as a light beam reflecting information on disc 107. The light beam is reflected by beam splitter 105, and let into a light receiving portion 110 through a light collecting lens 108 and a cylindrical lens 109.

When a light beam is divided into for example three beams with a diffraction grating, the zeroth-order diffracted light beam (referred to as main beam) of diffraction grating 103 in the center on disc 107, and the ±first-order diffracted light beams (referred to as sub beams) on opposite sides thereof are arranged in order to simultaneously perform reading with the three beams in total.

In the diffraction gratings used in the conventional pickups according to the first and second conventional examples, as shown in the plan view in FIG. 3 and the cross sectional view in FIG. 4, a grating recess 121 and a grating ridge 122 in diffraction grating substrate 130 are formed along straight lines and over an aperture surface in a constant grating cycle pn.

In the hologram scanner used for a laser printer disclosed by Japanese Patent Laying-Open No. 5-264923, the diffraction grating formed in the hologram is used for deflecting a single incident beam and does not divide this single beam into a plurality of beams. This is because this application requires a great beam intensity after diffraction, so if the beam is divided into a plurality of beams, the intensity of each diffracted light beam could be lowered, and a necessary beam intensity could not be obtained on the scanning surface. Therefore, only a diffracted light beam of the lowest order is typically used.

As a result, there is not disclosed in the document any such concept of correcting aberration in the diffracted light beam of the highest order when a plurality of high order diffracted light beams are used. The grating is formed to have curves in order to converge a beam spot in the X-direction (main scanning) and the Y-direction (sub scanning) on the scanning surface.

As described above, the diffraction grating of the optical pickup according to the first and second examples typically includes a straight line grating of an equal pitch as shown in FIGS. 3 and 4. In such a case, particularly in a multi-beam optical pickup which records/reproduces information to/from a plurality of tracks using a plurality of optical beams, the following problem is encountered.

In a multi-beam optical pickup, if the intervals Pd of beams on the disk is equal, the relation between Pd and the intervals Ph of the beams at the internal light receiving portion is given as follows:

$$Pd=Ph \cdot fOL/fCL$$

wherein the focal distance of the objective lens is fOL and the focal distance of the collimator lens is fCL.

In order to use a number of beams for recording/reproducing at a time, Pd should be small. To reduce Pd, Ph must be reduced or fCL must be increased. However, Ph is under restrictions as to the photoelectric conversion sensitivity and processing/assembling precision of the light receiving element and cannot be arbitrarily reduced, while the effective numerical aperture of the collimator lens is reduced by increasing fCL, which degrades the use efficiency of light. Therefore, the allowable image height on the disc determined by the aberration of the objective lens, collimator lens, diffraction grating, the disc and the like must be increased as much as possible.

In a conventional multi-beam optical pickup, however, a beam dividing diffraction grating having a straight line grating groove and a constant grating cycle over an aperture surface is employed, and therefore, the aberration is small for parallel light, while the aberration could be great for divergent rays as in the construction of the optical pickup disclosed by Japanese Patent Laying-Open No. 1-269239, which has been a main cause for degradation in the aberration of the entire optical system.

For example, FIG. 5 shows the wave front aberration of each beam in such a conventional multi-beam optical pickup, while FIG. 6 shows the wave front aberration derived from the diffraction grating therein. Herein, the image height refers to the position of the diffracted beam using the zeroth-order diffracted light beam on the disc as the origin.

When the reference value of each of beam wave front aberration (r. m. s. value) is 0.07λ (Marechal Criterion), the maximum allowable image height is about 25 $\mu$m. Therefore, if each of the beam intervals on the disc is 9 $\mu$m, only the beams up to the ±second-order diffracted beams may be available (2×9=18 $\mu$m<25 $\mu$m), and therefore reading with five beams is performed. In practice, however, the number of beams is smaller when the aberration and assembling errors of the optical elements constituting the pickup are taken into account.

As a result, the wave front aberration value in the ±third-order diffracted light beams exceeds the reference value as described above when the assembling tolerance of the elements is taken into account, and all the beams cannot be used for reading.

As can be seen from FIGS. 5 and 6 in comparison, a large part of the aberration of an optical system derives from the aberration of a diffraction grating.

FIG. 7 shows the wave front aberration of an optical system excluding a diffraction grating, FIG. 8 shows the wave front aberration of only the diffraction grating and FIG. 9 shows the wave front aberration of the entire optical system including the diffraction grating, each with ±third-order diffracted light beams (when the image height is 0.027 mm). The wave front aberration of only the diffraction grating is in the same direction as that of the wave front aberration of the optical system excluding the diffraction grating and both aberrations are added and given in FIG. 9 as the entire wave front aberration.

As described above, in such a conventional optical pickup, straight line diffraction gratings having an equal pitch are used, the aberration for a divergent luminous flux is great, the allowable image height cannot be increased, and the number of beams cannot be increased. As a result, the spot size of the sub beams on the high image height side cannot be reduced sufficiently, which adversely affects the jitter characteristic, and reading cannot be performed at sufficiently high speeds.

As described above, conventional diffraction grating having straight line gratings of an equal pitch cannot be used for applications which require high-order beams such as a multi-beam optical pickup.

Japanese Patent Laying-Open No. 7-302435 (hereinafter as the third conventional example) discloses the use of diffraction gratings having unequal pitches as a reflective type diffraction grating for dividing a beam into three in a pickup using the 3-beam method for tracking control, which will be now described.

Herein, as shown in FIG. 10, a beam emitted from a semiconductor laser 147 has its advancing direction turned by 90° and is divided into three beams using a reflective type diffraction grating 81 positioned at an angle of 45° with respective to the optical axis. Each of the beams is collected on a disc 146 through a hologram element 149 and a light collecting lens 145. A light beam reflected from disc 146 is passed through light collecting lens 145, goes through the first-order diffraction (or−first-order diffraction) by hologram element 149 and let into a light receiving element 150.

In a pickup using a reflective type diffraction grating, since the optical axis of incident light into the diffraction grating is inclined, the distance between the zeroth-order diffracted light beam and the ±first-order diffracted light beams is asymmetrical. According to the third conventional example, diffraction grating 81 is formed to have a cycle longer along the direction of the arrow X as shown in FIG. 11 in order to correct this asymmetry.

More specifically, diffraction grating 81 according to the third conventional example has unequal pitches and this is for the purpose of correcting the diffracted light beam so that the +first-order diffracted light beam and −first-order diffracted light beam will be symmetric with respect to the zeroth-order diffracted light beam, rather than correcting the aberration of the ±second or higher order diffracted light beams, and if the ±first-order diffracted light beams satisfy the conditions of a defined wave front aberration, it does not mean that beams of higher orders also satisfy the conditions of the wave front aberration. According to the third conventional example, a method of designing to satisfy a prescribed wave front aberration for beams of ±second or higher orders is not suggested.

In the multi-beam optical pickup described above, the wave front aberration of higher order diffracted light beams should also be equal to or lower the defined level, and therefore the diffraction grating according to the third conventional example cannot be applied.

In addition, the third conventional example is directed to a solution to the asymmetry of the ±first-order diffracted light beams unique to the reflective diffraction grating, and a transparent type diffraction grating having the ±first-order diffracted light beams being symmetric is not addressed by the third conventional example.

As a result of research by the inventors, however, it was found that the wave front aberration of a higher order diffracted light beam was particularly disadvantageous when a divergent luminous flux was used in a transparent diffraction grating as shown in FIGS. 5 and 6.

Furthermore, although the grating according to the third conventional example is formed by straight lines, such straight line grating can only reduce the wave front aberration to a limited level.

SUMMARY OF THE INVENTION

It is an object of the present invention to provide a diffraction grating for generating a plurality of beams which can restrain the front wave aberration of higher order sub beams as well as a main beam.

Another object of the present invention is to provide a diffraction grating for generating a plurality of beams which permits the spot size of each beam to be sufficiently limited and the jitter characteristic to be improved.

Yet another object of the present invention is to provide a multi-beam optical pickup which can restrain the wave front aberration of higher order sub beams as well as a main beam.

A still further object of the present invention is to provide a multi-beam optical pickup which permits the spot size of each beam to be sufficiently limited and the jitter characteristic to be improved.

According to one aspect of the present invention, the diffraction grating for generating a plurality of beams includes a plurality of gratings formed to have an axis of symmetry perpendicular to the direction in which a beam is divided on the surface of the diffraction grating and includes at least two gratings having different fundamental cycles.

The diffraction grating for generating a plurality of beams includes a plurality of gratings on the surface of thereof formed to have an axis of symmetry perpendicular to the direction in which a beam is divided, and at least two of the plurality of gratings have different fundamental cycles, so that the aberration in the periphery of divergent light may be reduced.

According to another aspect of the present invention, the diffraction grating for generating a plurality of beams includes a plurality of gratings, which are formed in a curved shape on the surface of the diffraction grating and include at least two gratings having different fundamental cycles.

The diffraction grating have a plurality of gratings formed in a curved shape on the surface thereof and at least two of the plurality of gratings have different fundamental cycles, so that the aberration in the periphery of divergent light may be reduced.

According to a further aspect of the present invention, a multi-beam optical pickup includes a semiconductor laser, a diffraction grating for generating a plurality of beams having a plurality of gratings which have an axis of symmetry perpendicular to the direction in which a beam is divided on the surface and at least two of which have different fundamental cycles, a hologram element for transmitting a light beam transmitted through the diffraction grating for generating a plurality of beams and reflected from a recording medium, and an internal light receiving portion for receiving a light beam transmitted through the hologram element.

The diffraction grating for generating a plurality of beams have a plurality of gratings which have an axis of symmetry perpendicular to the direction in which a beam is divided on the surface thereof, and at least two of which have different fundamental cycles, and therefore the wave front aberration of the diffraction grating for generating a plurality of beams may be reduced, so that the wave front aberration of the entire optical system including the diffraction grating for generating a plurality of beams may be reduced.

According to an additional aspect of the present invention, a multi-optical pickup includes a semiconductor laser, a diffraction grating for generating a plurality of beams having a plurality of gratings which are formed in a curved shape on the surface and at least two of which have different fundamental cycles, a hologram element for transmitting a light beam transmitted through the diffraction grating for generating a plurality of beams and reflected from a recording medium, and a internal light receiving element for receiving a light beam transmitted through the hologram element.

The diffraction grating have a plurality of gratings which are formed in a curved shape on the surface and at least two of which have different fundamental cycles, and therefore a wave front aberration in the opposite direction to the wave front aberration of the optical system excluding the diffraction grating for generating a plurality of beams may be generated in order to reduce the wave front aberration of the entire optical system including the diffraction grating for generating a plurality of beams.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 12:
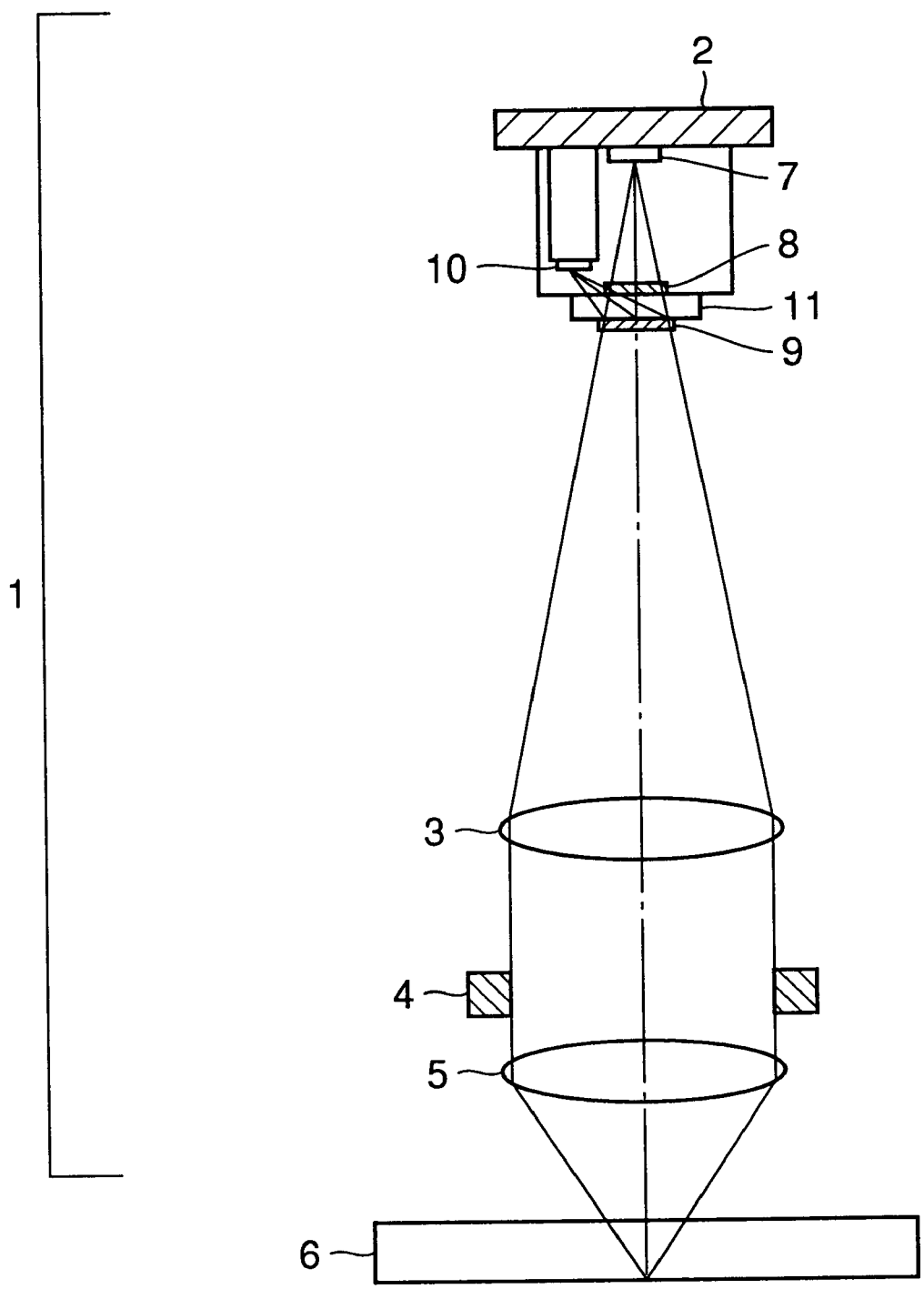
FIG. 12 is a view of a multi-beam optical pickup according to a first embodiment of the present invention.

A multi-beam optical pickup according to a first embodiment of the present invention will be now described, as shown in FIG. 12.

Note that a 7-beam multi-beam optical pickup will be described in the following, but the number of beams is not limited to seven.

In FIG. 12, multi-beam optical pickup 1 includes a hologram laser unit 2, a collimator lens 3, an aperture 4, and an objective lens 5.

Hologram laser unit 2 consists of a semiconductor laser 7, a transparent type unequal-pitch diffraction grating 8, a hologram element 9 and internal light receiving portion 10 as these elements are integrally formed. Unequal-pitch diffraction grating 8 is formed on a surface of hologram glass 11 on the side of semiconductor laser 7, and hologram element 9 is formed on a surface on the side of a disc 6. Unequal-pitch diffraction grating 8 is provided approximately perpendicularly to the optical axis of a light beam emitted from semiconductor laser 7, and transmits and divides the emitted light beam into a plurality of beams as will be described.

The operation of the multi-beam optical pickup will be now described.

A light beam emitted from semiconductor laser 7 comes into unequal-pitch diffraction grating 8 as a divergent luminous flux, and divided into 7 beams, i.e., the zeroth-order diffracted light beam (main beam B0), the +first-order diffracted light beam (B1(+)), the −first-order diffracted light beam (B1 (−)), the +second-order diffracted light beam (B2 (+)), the −second-order diffracted light beam (B2 (−)), the +third-order diffracted light beam (B3 (+)), the −third-order diffracted light beam (B3 (+)), and the −third-order diffracted light beam (B3 (−)), which are transmitted through collimator lens 3 and objective lens 5 and collected on disc 6.

Light reflected from disc 6 proceeds in the opposite path to the above, is passed through objective lens 5 and collimator lens 3. Then, the beam is diffracted by hologram element 9 and let into internal light receiving portion 10 which detects RF, FES, and RES signals.

In order to read out RF signals for the 7 beams or 7 tracks accurately and at high speed, not only the spot size of the main beam (B0) but also the spot size of sub beams B1(+), B1 (−), B2 (+), B2 (−), B3 (+) and B3 (−) must be sufficiently limited.

Figure 13:
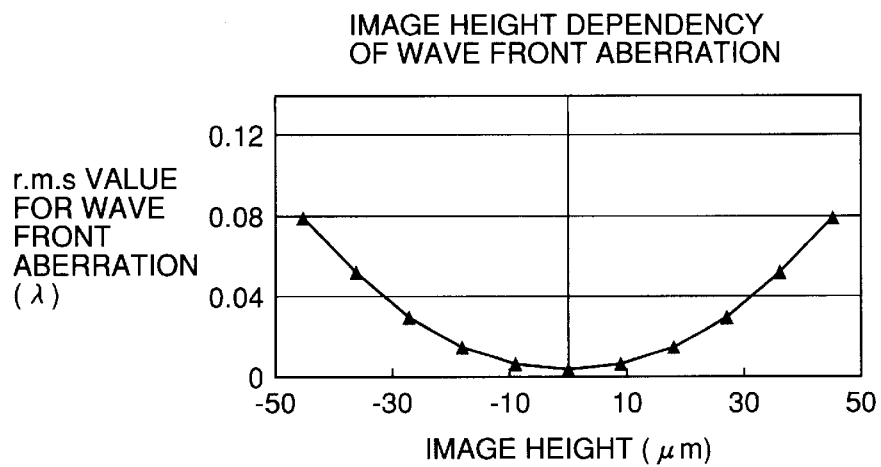
FIG. 13 is a graph showing the wave front aberration of the entire multi-beam optical pickup using an unequal-pitch diffraction grating with a numerical example 1.

Herein, an example of the relation between each beam and the wave front aberration using an unequal-pitch diffraction grating according to the present invention (an example using an unequal-pitch diffraction grating with numerical example 1 which will be described) is shown in FIG. 13. Similarly to the case of the conventional equal pitch diffraction grating, the beam pitch between main beam B0 and sub beams B1(+), B1 (−), B2 (+), B2 (−), B3 (+) and B3 (−) on the disc is 9 $\mu$m.

As can be seen from FIG. 13, using the unequal-pitch diffraction grating, the reference value (Marechal Criterion)

of the wave front aberration (r. m. s. value) up to the ±fourth-order diffracted light beam is 0.07λ or lower, and all the seven beams can be reduced in size to the limit of diffraction.

An allowable image height corresponding to the reference value 0.07λ or lower is about 42 μm, which is greater than the conventional level of 25 μm. As a result as the image height is greater, the number of beams which can be formed in the allowable image height with a constant beam pitch can be increased. The maximum number of available beams is given as follows:

Int (42 μm/9 μm)=Int (4.67)=4

In other word, 4 high order beams can be used on each side. Herein, function Int (x) represents the largest integer not more than x. As a result, 9 beams altogether on both sides including the zeroth-order light beam satisfy a desired wave front aberration.

Figure 14:
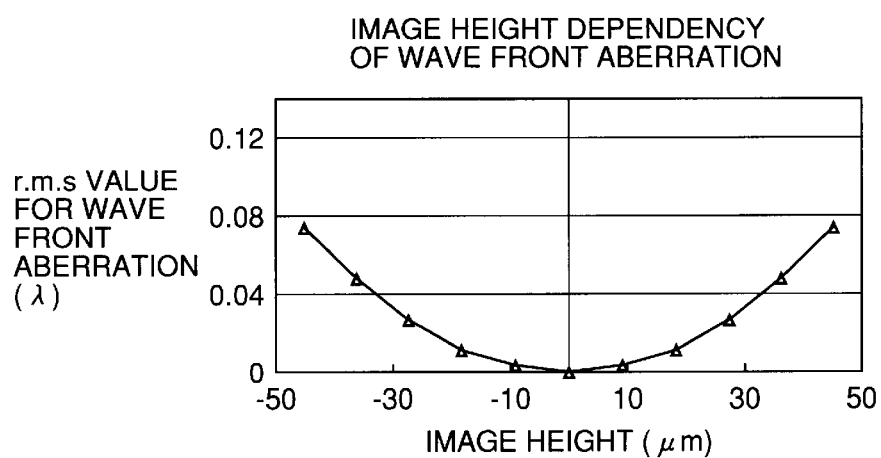
FIG. 14 is a graph showing the wave front aberration of the unequal-pitch diffraction grating with numerical example 1.

The wave front aberration caused only by the diffraction grating at this time is sufficiently restrained as shown in FIG. 14 (if an unequal-pitch diffraction grating with numerical example 1 which will be described is used).

Note that in this embodiment, the focal distance of the objective lens is 2.8 mm, the numerical aperture is 0.6, the numerical aperture of the collimator lens 0.09, and the wavelength of the light source 650 nm.

An unequal-pitch diffraction grating according to the present invention will be now described further in detail in comparison with a conventional equal pitch diffraction grating.

In the conventional equal pitch diffraction grating, a beam may be divided while restraining the aberration from the zeroth to higher orders if a parallel luminous flux is incident. However, when a hologram pickup having integrally formed a semiconductor laser 112, a diffraction grating 113, a hologram element 114, an internal light receiving portion 118 or the like is used for the purpose of integrating the device, reducing the size and cost and facilitating adjustment of the device, the diffraction grating is placed in the middle of a divergent luminous flux, the angle of incidence is different between the center of the luminous flux and the periphery, which causes astigmatism and increases the aberration of the entire optical system. The inventors found that the aberration of the entire optical system might be restrained to a small level by using a diffraction grating with a cycle variable within the diffraction grating surface, particularly such a cycle that decreased toward the center and increased toward the periphery.

A diffraction grating optimized such that the aberration of the entire optical system as shown in FIG. 12 is reduced will be now described.

The inventors studied about a number of grating cycles for an unequal-pitch diffraction grating, and concluded that a y-coordinate (y: the coordinate of the direction perpendicular to the grating of the straight line grating) representing the position of each grating particularly satisfied the following expression:

$f(y,n)=0$ and that f (y, n) formed of a polynomial including a term represented as follows generated a good result:

$a \cdot y - b \cdot y^3 - c \cdot n$ wherein a, b and c are constants with the same sign, n=±1, ±2, ±3, . . . A numerical example (numerical example 1) of the grating cycle of a specific unequal-pitch diffraction grating is given in Table 1.

TABLE 1

| n | Grating Cycle (mm) |
|---|---|
| 1 | 0.01566 |
| 2 | 0.01567 |
| 3 | 0.01567 |
| 4 | 0.01568 |
| 5 | 0.0157 |
| 6 | 0.01571 |
| 7 | 0.01574 |
| 8 | 0.01576 |
| 9 | 0.01579 |
| 10 | 0.01582 |
| 11 | 0.01586 |
| 12 | 0.01589 |
| 13 | 0.01594 |
| 14 | 0.01599 |
| 15 | 0.01604 |
| 16 | 0.01609 |
| 17 | 0.01615 |
| 18 | 0.01622 |
| 19 | 0.01629 |
| 20 | 0.01636 |
| 21 | 0.01644 |
| 22 | 0.01653 |
| 23 | 0.01662 |
| 24 | 0.01671 |
| 25 | 0.01681 |
| 26 | 0.01692 |
| 27 | 0.01704 |
| 28 | 0.01716 |
| 29 | 0.01729 |
| 30 | 0.01743 |
| 31 | 0.01758 |
| 32 | 0.01774 |
| 33 | 0.01791 |
| 34 | 0.01809 |
| 35 | 0.01827 |
| 36 | 0.01848 |
| 37 | 0.01869 |
| 38 | 0.01893 |
| 39 | 0.01917 |

Note that in numerical example 1, the y-coordinate of the position of each grating is given by the following expression:

$$0.0415y - 0.00614y^3 - 0.00065n = 0 \qquad (1)$$

wherein y is a coordinate in the direction perpendicular to the grating of the straight line grating, n is a grating number counted from the center of the diffraction grating, if y>0, n=1, 2, 3, . . . , and if y<0, n=−1, −2, −3 , . . .

Figure 15:
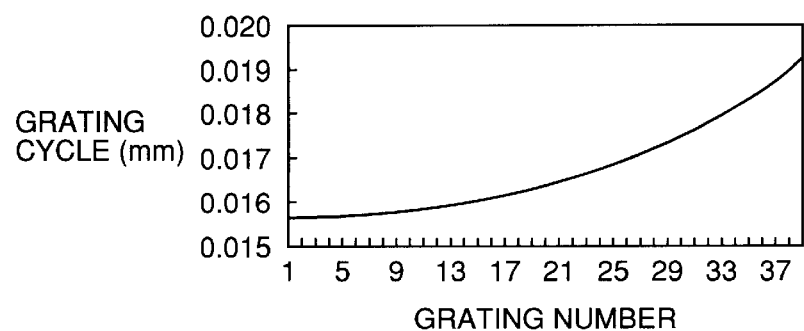
FIG. 15 is a graph showing the grating cycle of the unequal-pitch diffraction grating with numerical example 1.

A result of translation between grating cycles and grating numbers is given in FIG. 15. As the grating number increases, in other words in the direction toward the periphery, the grating cycle increases.

Note that Table 1 and FIG. 15 show only the part from the center to one side of the diffraction grating, but in practice, the cycles are symmetrical with respect to a straight line through the optical axis in the direction perpendicular to the direction in which a beam is divided. In FIG. 15, for example, it is as folded in the negative grating number direction relative to the axis of grating number 1.

Figure 16:
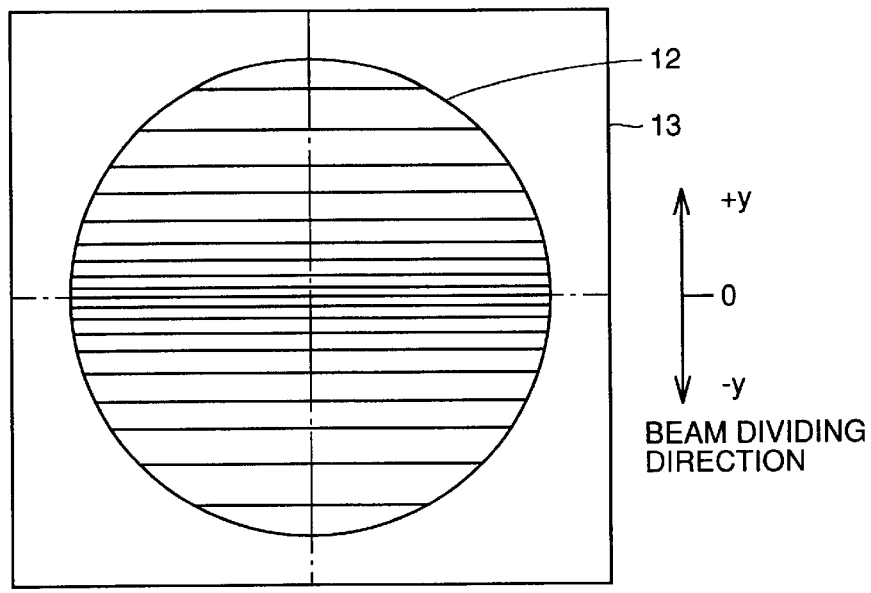
FIG. 16 is a top view of an unequal-pitch diffraction grating according to the first embodiment.

FIG. 16 is a schematic top view of the fundamental cycles of the unequal-pitch diffraction grating with this numerical example. A diffraction grating portion 12 has gratings ruled perpendicularly to the direction in which a beam is divided by the gratings, and the grating cycles are symmetrical with respect to a straight line passing through the crossing of the optical axis and parallel to the direction of the gratings. The grating cycle decreases toward the crossing of the diffraction grating surface and the optical axis, in other words, in positions near the center of the diffraction grating, and increases apart from the center.

Thus, by setting the grating cycle to be greater in the periphery of the luminous flux than the vicinity of the optical axis, the aberration of the periphery of the divergent luminous flux may be reduced, so that the wave front aberration of the entire luminous flux may be reduced to a small level as shown in FIGS. 13 and 14.

Figure 17:
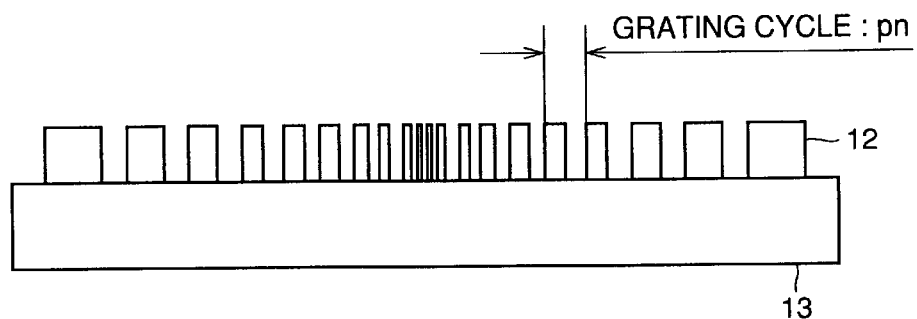
FIG. 17 is a cross sectional view of the unequal-pitch diffraction grating according to the first embodiments.

FIG. 17 is a cross sectional view of an unequal-pitch diffraction grating. The grating cycle refers to the cycle of fundamental repetition of the diffraction gratings, and for example grating cycle pn at the n-th position counted from the center of the diffraction grating is as shown in the figure.

Figure 18:
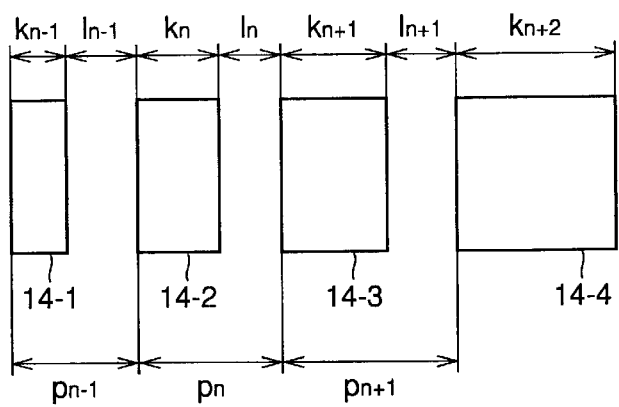
FIG. 18 is a representation for use in illustration of the shape of the unequal-pitch diffraction grating according to the first embodiment.
Figure 19:
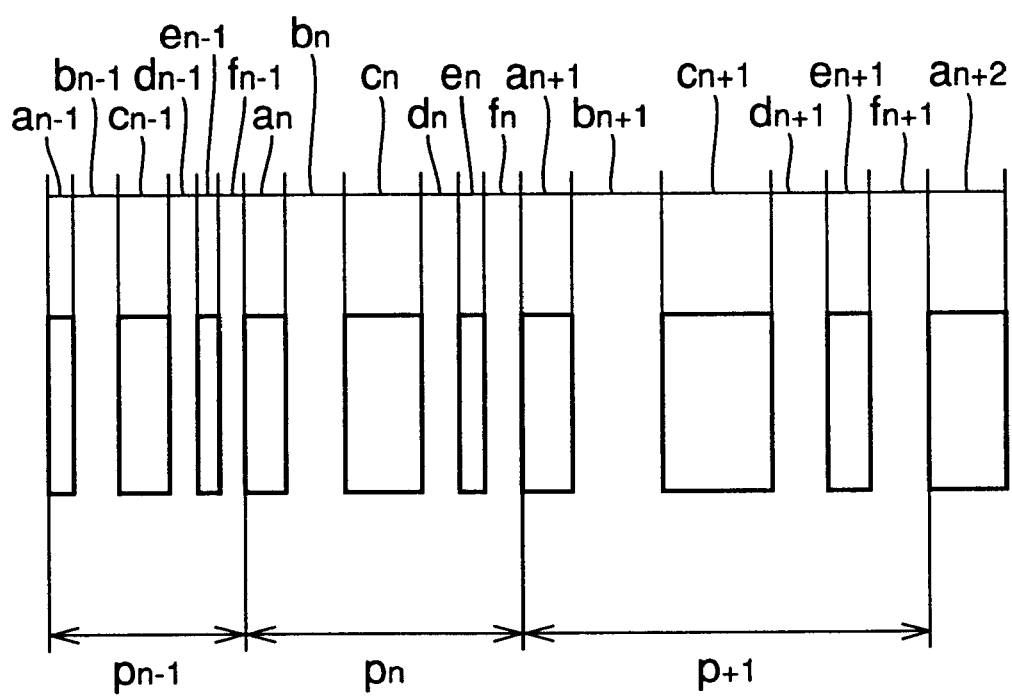
FIG. 19 is a representation for use in illustration of another example of the shape of the unequal-pitch diffraction grating according to the first embodiment.

Whether each ridge 14-1, 14-2, 14-3 and 14-4 is present in one cycle (each recess is also present in one cycle) as shown in FIG. 18, or a set of three ridges and three recesses is each present in one cycle as shown in FIG. 19, the grating cycle is defined similarly using p as shown in FIGS. 18 and 19, respectively. Note that the shape of grating in the fundamental cycle is optimally designed by efficient distribution of diffraction orders.

In the unequal pitch diffraction grating according to this embodiment, sizes a, b, c, d, e, k and i are determined based on their ratios an relative to p.

Therefore, the following is established:

$$k_{n-1}/p_{n-1} = k_n/p_n = k_{n+1}/p_{n+1} = \ldots$$

$$i_{n-1}/p_{n-1} = i_n/p_n = i_{n+1}/p_{n+1} = \ldots$$

and $$a_{n-1}/p_{n-1} = a_n/p_n = a_{n+1}/p_{n+1} = \ldots$$

$$b_{n-1}/p_{n-1} = b_n/p_n = b_{n+1}/p_{n+1} = \ldots$$

$$c_{n-1}/p_{n-1} = c_n/p_n = c_{n+1}/p_{n+1} = \ldots$$

$$d_{n-1}/p_{n-1} = d_n/p_n = d_{n+1}/p_{n+1} = \ldots$$

$$e_{n-1}/p_{n-1} = e_n/p_n = e_{n+1}/p_{n+1} = \ldots$$

$$f_{n-1}/p_{n-1} = f_n/p_n = f_{n+1}/p_{n+1} = \ldots$$

The fundamental cycle of a diffraction grating according to the present invention defines the direction of a light beam as described above, any shape in design can be employed within the fundamental cycle and the same effect is provided.

With numerical example 1, as shown in FIGS. 13 and 14, the aberration of the entire optical system including all the elements such as the objective lens, collimator lens, diffraction grating, and disc is approximate to the aberration of only the diffraction grating. This is because the aberration in the opposite direction to the aberration derived from the objective lens, collimator lens, disc and the like is generated by the unequal-pitch diffraction grating for correction, which can be optimized for example when the optical system is changed.

Figure 1:
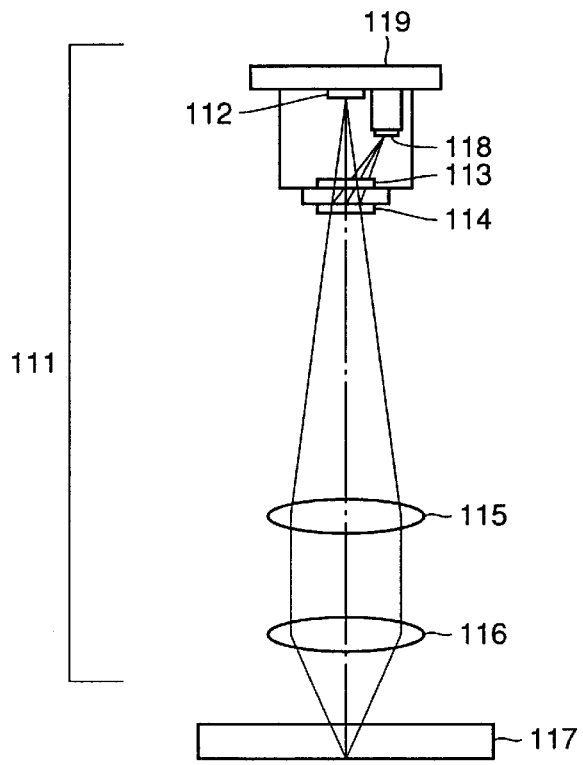
FIG. 1 is a view of a conventional optical pickup.
Figure 2:
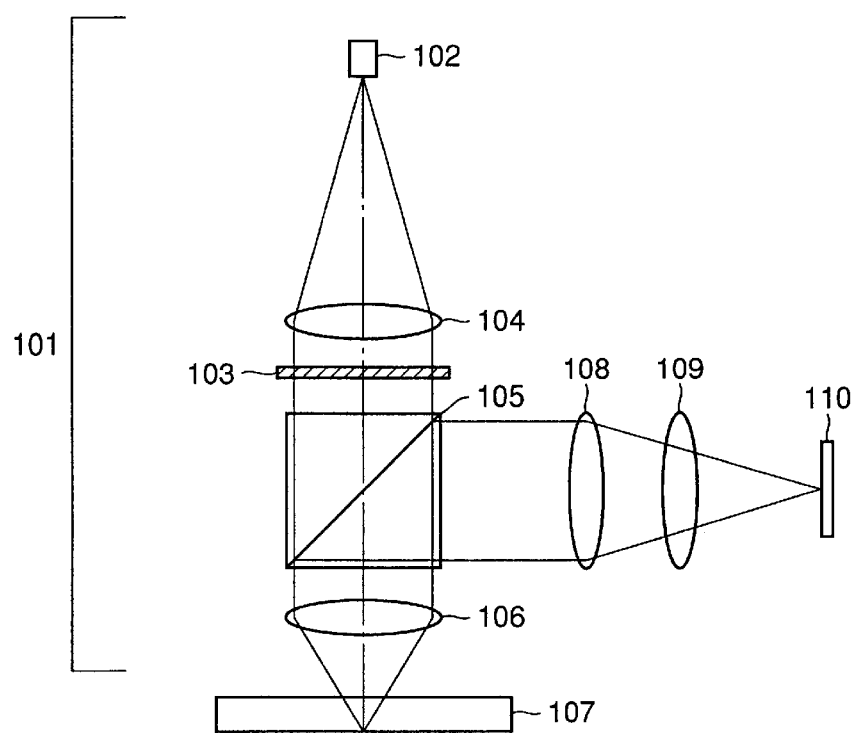
FIG. 2 is a view of a conventional multi-beam optical pickup.
Figure 3:
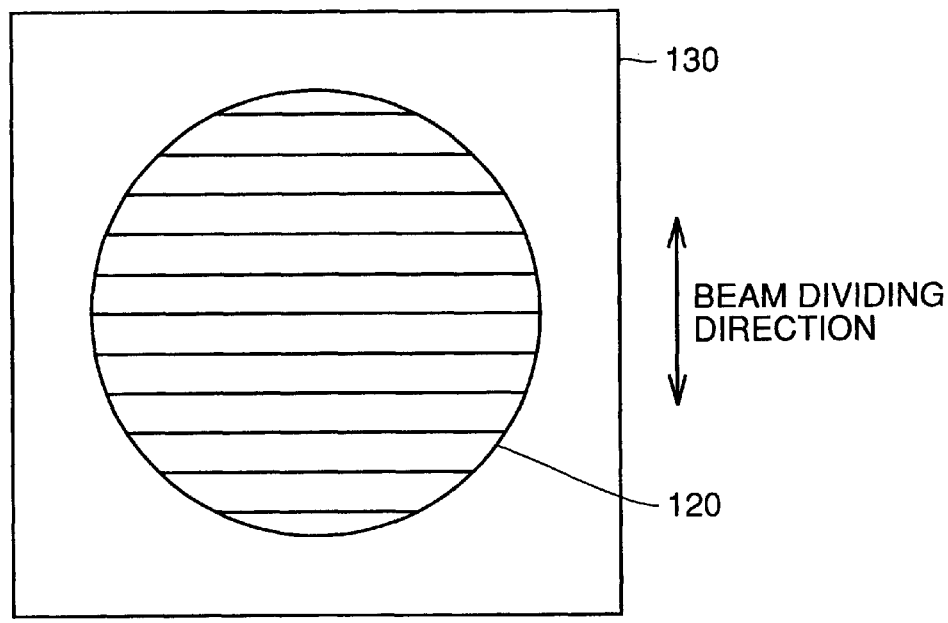
FIG. 3 is a top view of a diffraction grating for use in a conventional optical pickup.
Figure 4:
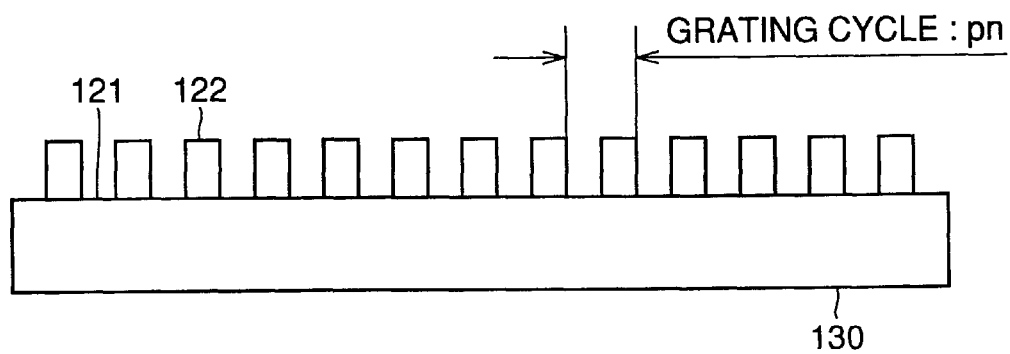
FIG. 4 is a cross sectional view of the diffraction grating shown in FIG. 3.
Figure 5:
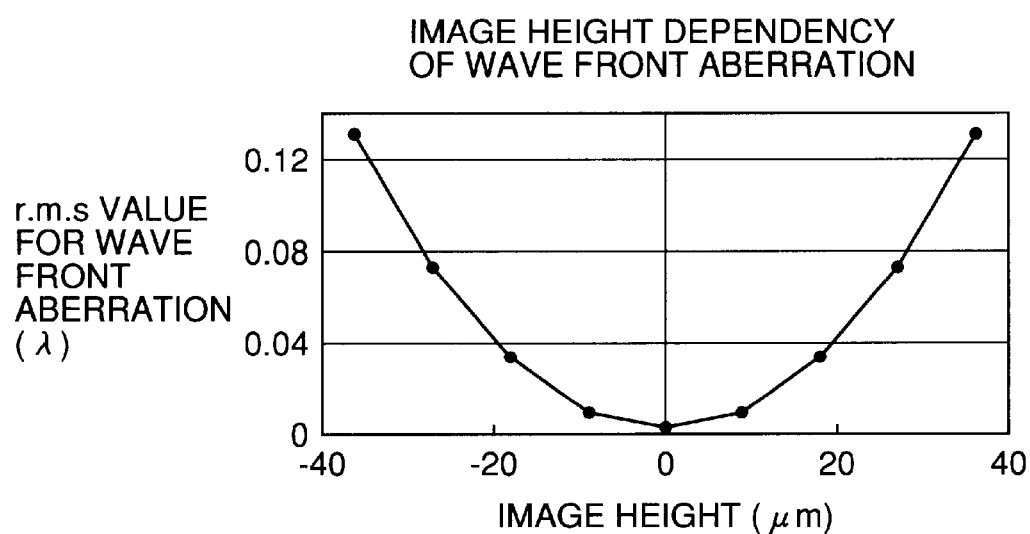
FIG. 5 is a graph showing the wave front aberration of the entire optical system in a conventional multi-beam optical pickup.
Figure 6:
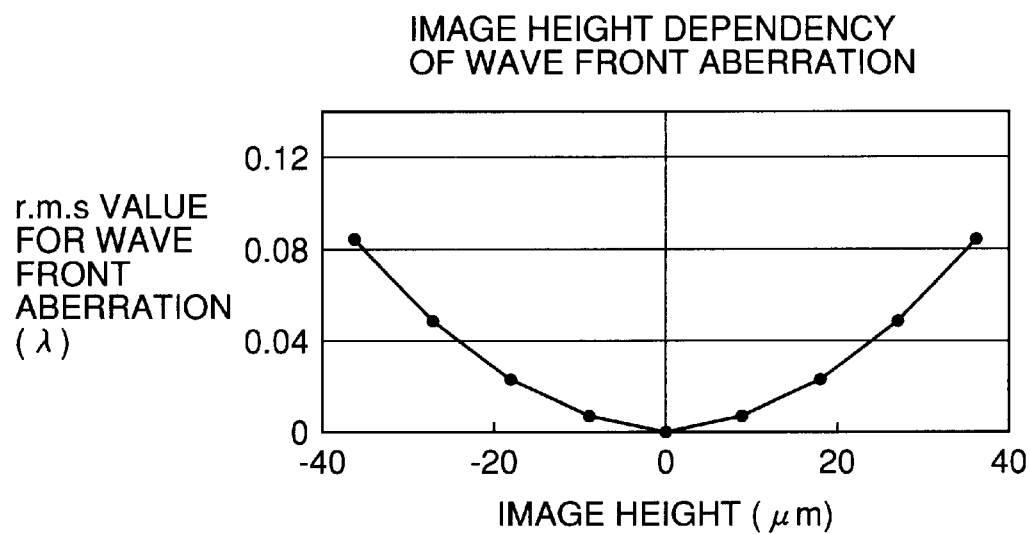
FIG. 6 is a graph showing the wave front aberration of the entire optical system in a conventional multi-beam optical pickup.
Figure 7:
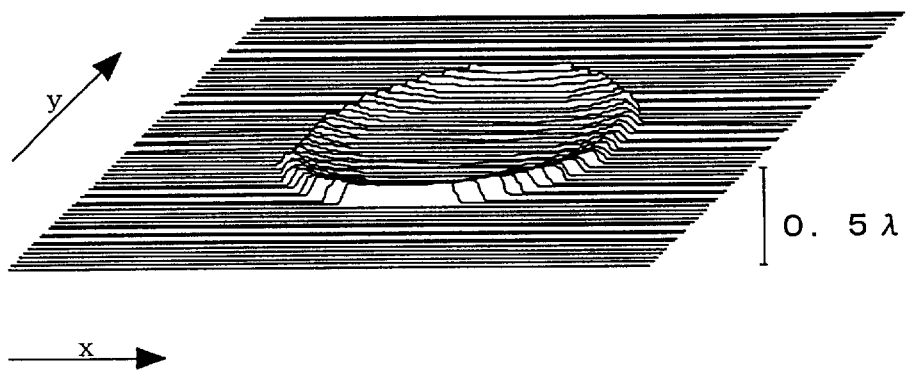
FIG. 7 is a representation of the wave front aberration of the entire optical system excluding a diffraction grating in a conventional multi-beam optical pickup.
Figure 8:
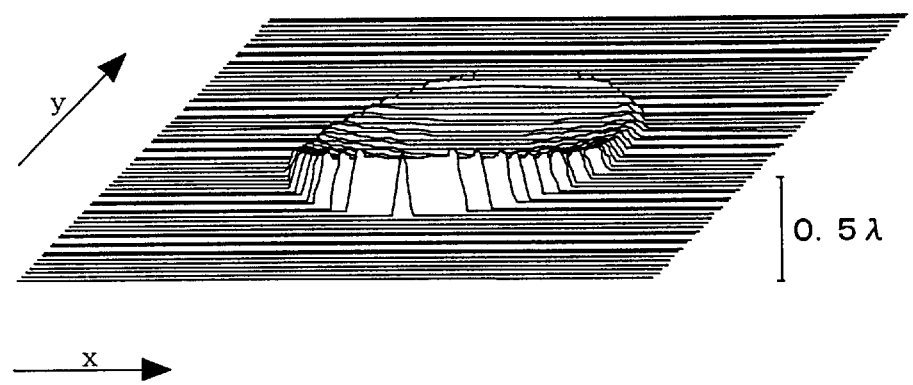
FIG. 8 is a representation of the wave front aberration of only the diffraction grating in the conventional multi-beam optical pickup.
Figure 9:
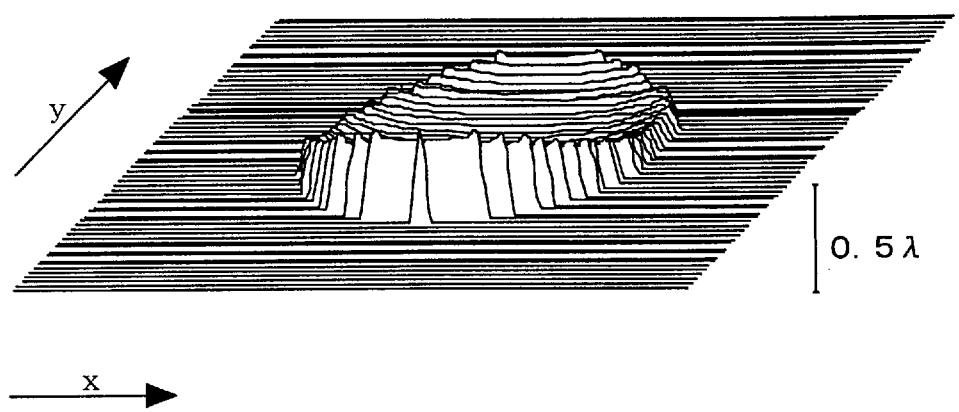
FIG. 9 is a representation of the wave front aberration of the entire optical system in the conventional multi-beam optical pickup.
Figure 10:
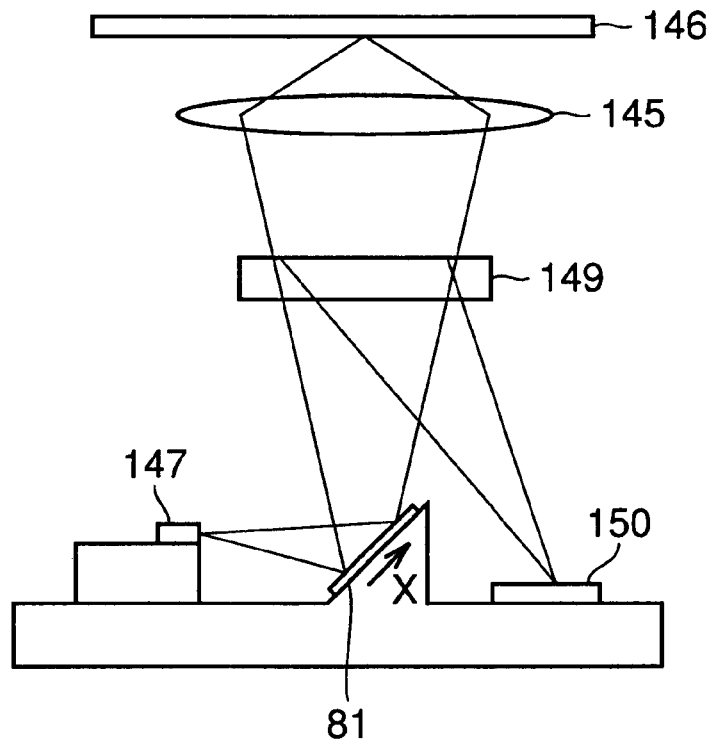
FIG. 10 is a view of an optical pickup using a conventional unequal-pitch diffraction grating.
Figure 11:
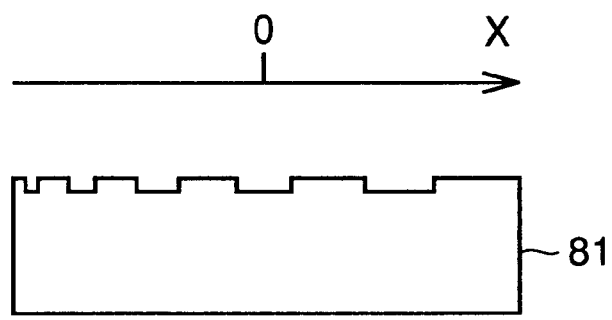
FIG. 11 is a view of an unequal-pitch diffraction grating used in the optical pickup shown in FIG. 10.

In the multi-beam optical pickup using the unequal-pitch diffraction grating with numerical example 1, the aberration of each of optics, errors in assembling parts and the quantity of a laser beam should be taken into account, while as shown in FIGS. 13 and 14, 9 beams satisfy desired wave front aberration in numerical example 1, and therefore a 9-beam multi-beam optical pickup may be employed.

The inventors also studied about diffraction gratings represented by higher order polynomials in addition to the diffraction grating represented by the above expression (1) (third order polynomial). The expressions therefor are given as follows:

$$0.0415y - 0.0061323y^3 - 0.000017475y^5 - 0.00065n = 0 \quad (2)$$

and $$0.0415y - 0.0059864y^3 - 0.000052429y^5 - 0.010013y^7 - 0.00065n = 0 \quad (3)$$

wherein y is a coordinate shown in FIG. 16, n is a grating number counted from the center of the diffraction grating, if y>0, n=1, 2, 3, ..., and if y<0, n=−1, −2, −3, ...

Figure 20:
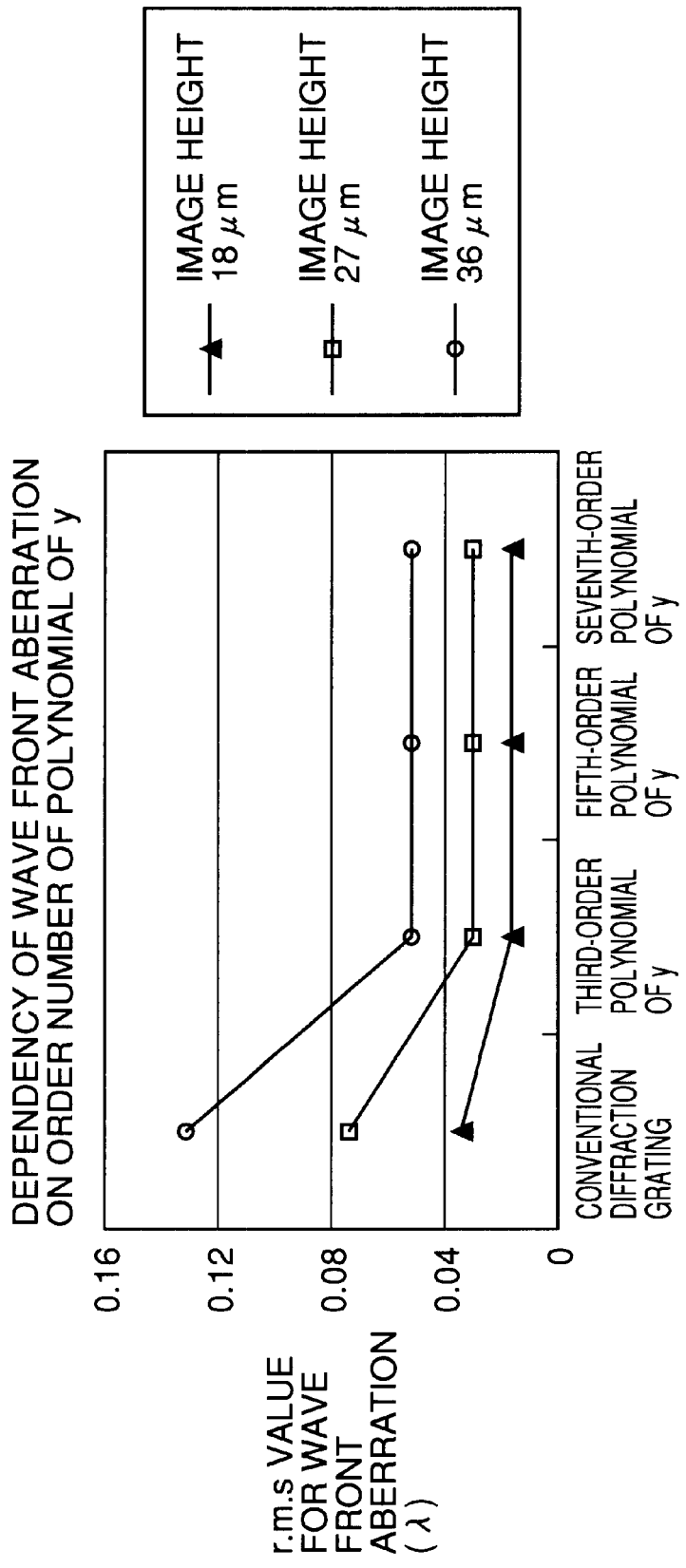
FIG. 20 is a graph showing the wave front aberration of the unequal-pitch diffraction grating by polynomials of various orders according to the first embodiment.

FIG. 20 shows the wave front aberration when the grating is positioned according to the third-order polynomial of y represented by expression (1), the wave front aberration when the grating is positioned according to the fifth-order polynomial represented by expression (2), and the wave front aberration when the grating is positioned according to the seventh-order polynomial represented by expression (3), each in comparison with a conventional diffraction grating (straight line, equal pitch type), wherein the image height is 18 μm, 27 μm, and 36 μm. The diffraction grating according to the present invention is much improved over the conventional diffraction grating in the wave front aberration for each of the polynomials, but the wave front aberrations by the fifth-order polynomial and the seventh-order polynomial are not much different from that according to the third-order polynomial. As a result, according to this embodiment, necessary and sufficient effects may be provided when the position of the grating is represented by the third-order polynomial of y.

As in the foregoing, using the multi-beam optical pickup according to the present embodiment, the aberration of not only the main beam but also the higher order sub beams may be restrained, the spot size can be sufficiently limited and the jitter characteristic of each beam may be improved. As a result, the number of beams may be increased, which enables reading at higher speeds.

Second Embodiment

An embodiment of the invention optimized to reduce the aberration derived from the diffraction grating will be now described.

As a result of studying a number of grating cycles for an unequal-pitch diffraction grating, also according to this embodiment, the y-coordinate of the position of each grating (the y-coordinate in FIG. 16) satisfies the following expression:

$$f(y, n) = 0$$

and a good result is obtained when f (y, n) consists of a polynomial including a term represented by the following expression:

$$a \cdot y - b \cdot y^3 - c \cdot n$$

wherein a, b and c are constants with the same sign, and n=±1, ±2, ±3, ... A numerical example (numerical example 2) of the grating cycle of a specific unequal-pitch diffraction grating is given in Table 2.

Note that numerical example 2 represents the case when the y-coordinate of the position of each grating is given by the following expression:

$$0.0415y - 0.00416y^3 - 0.00065n = 0 \quad (4)$$

wherein y is a coordinate in FIG. 16, and n is the number of the grating counted from the center of the diffraction grating.

TABLE 2

| n | Grating Cycle (mm) |
|---|---|
| 1 | 0.01566 |
| 2 | 0.01567 |
| 3 | 0.01567 |
| 4 | 0.01568 |
| 5 | 0.01569 |
| 6 | 0.0157 |
| 7 | 0.01571 |
| 8 | 0.01573 |
| 9 | 0.01575 |
| 10 | 0.01577 |
| 11 | 0.01579 |
| 12 | 0.01582 |
| 13 | 0.01585 |
| 14 | 0.01588 |
| 15 | 0.01591 |
| 16 | 0.01595 |
| 17 | 0.01599 |
| 18 | 0.01603 |
| 19 | 0.01608 |
| 20 | 0.01612 |
| 21 | 0.01618 |
| 22 | 0.01623 |
| 23 | 0.01629 |
| 24 | 0.01635 |
| 25 | 0.01641 |
| 26 | 0.01648 |
| 27 | 0.01655 |
| 28 | 0.01663 |
| 29 | 0.01671 |
| 30 | 0.01679 |
| 31 | 0.01688 |
| 32 | 0.01697 |
| 33 | 0.01707 |
| 34 | 0.01717 |
| 35 | 0.01728 |
| 36 | 0.01739 |
| 37 | 0.01751 |
| 38 | 0.01764 |
| 39 | 0.01777 |

Figure 21:
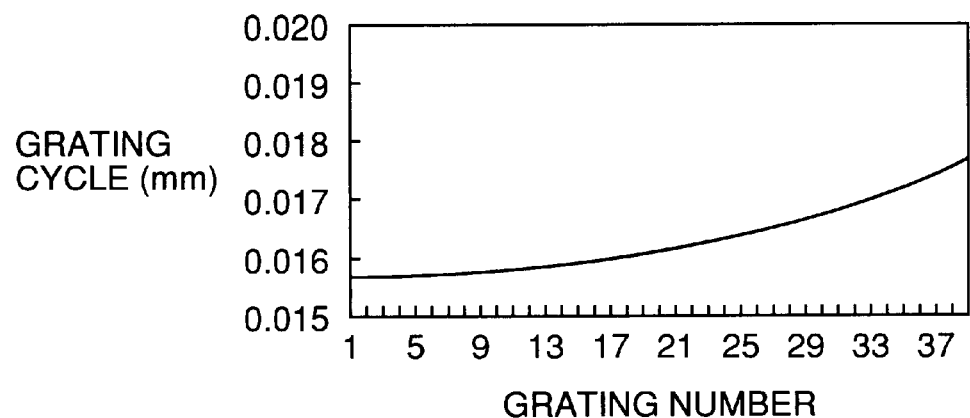
FIG. 21 is a graph showing the grating cycle of an unequal-pitch diffraction grating with a numerical example 2.

A result of translation based on the above expression between grating cycles and grating numbers is given in FIG. 21. Similarly to expression (1), as the grating number increases, in other words in the direction toward the periphery, the grating cycle increases. In addition, the grating cycle changes more gently than that represented by expression (1).

Figure 22:
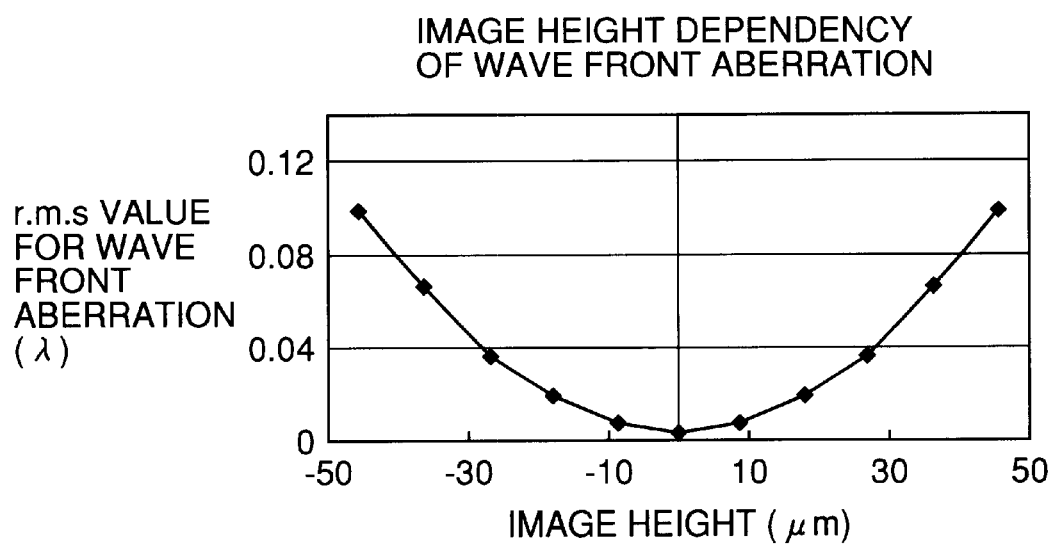
FIG. 22 is a graph showing the wave front aberration of the entire multi-beam optical pickup using the unequal-pitch diffraction grating with numerical example 2.
Figure 23:
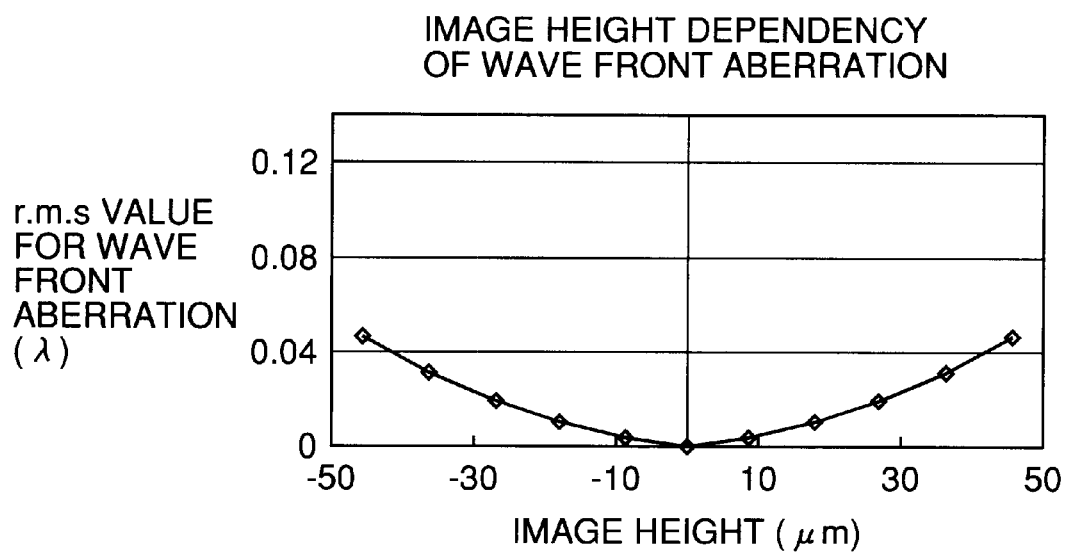
FIG. 23 is a graph showing the wave front aberration of the unequal-pitch diffraction grating with numerical example 2.

The wave front aberration at this time is given in FIG. 22, and the wave front aberration of only the diffraction grating is given in FIG. 23.

The aberrations shown in FIGS. 22 and 23 are restrained to a small level, and the allowable image height for a wave front aberration of 0.07λ or lower is greatly improved to 37 μm, and diffracted light beams up to the ±fourth-order diffracted light beams are allowed. In a pickup using the unequal-pitch diffraction grating with numerical example 2, a 5-beam multi-beam optical pickup for example may be formed in view of the aberration of each of optics, errors in assembling parts, and laser beam quantity.

As described above, the embodiment is optimized to reduce the aberration resulting from the diffraction grating, so that the same effects may be provided using optics such as objective lens and collimator lens having different aberration values.

Similarly to the first embodiment, the grating may take various shapes as shown in FIGS. 16 to 19 according to this embodiment.

Figure 24:
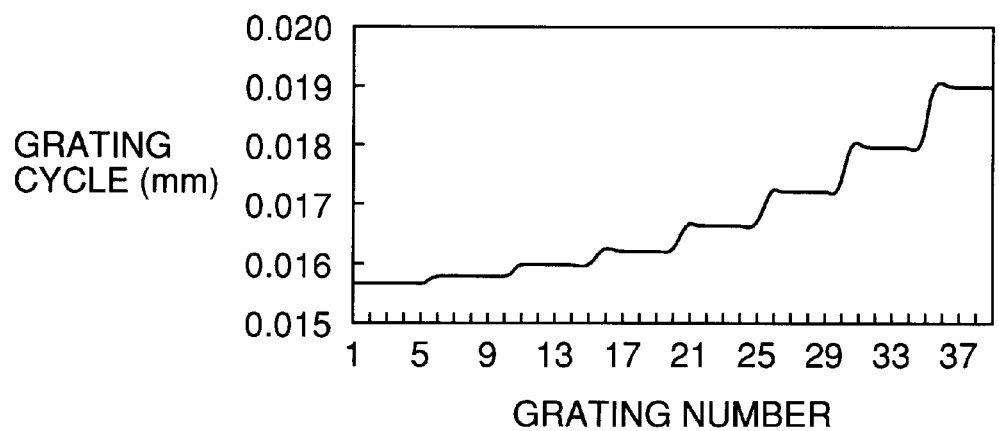
FIG. 24 is a graph showing another example of the grating cycle of an unequal-pitch diffraction grating according to a second embodiment of the present invention.

As in the foregoing, according to this embodiment, the grating cycle gradually changes in the numerical example, but the diffraction grating may be divided into a plurality of regions as represented by the numerical example in Table 3, and allowed to change for each region at the same grating cycle in the region, and still sufficient effects may be provided. A result of translation between grating cycles and grating numbers is given in FIG. 24. As can be seen, unlike FIGS. 15 and 21, the grating cycle changes step-wise.

TABLE 3

| n | Grating Cycle (mm) |
|---|---|
| 1 | 0.01567 |
| 2 | 0.01567 |
| 3 | 0.01567 |
| 4 | 0.01567 |
| 5 | 0.01567 |
| 6 | 0.01576 |
| 7 | 0.01576 |
| 8 | 0.01576 |
| 9 | 0.01576 |
| 10 | 0.01576 |
| 11 | 0.01594 |
| 12 | 0.01594 |
| 13 | 0.01594 |
| 14 | 0.01594 |
| 15 | 0.01594 |
| 16 | 0.01622 |
| 17 | 0.01622 |
| 18 | 0.01622 |
| 19 | 0.01622 |
| 20 | 0.01622 |
| 21 | 0.01662 |
| 22 | 0.01662 |
| 23 | 0.01662 |
| 24 | 0.01662 |
| 25 | 0.01662 |
| 26 | 0.01716 |
| 27 | 0.01716 |
| 28 | 0.01716 |
| 29 | 0.01716 |
| 30 | 0.01716 |
| 31 | 0.01791 |
| 32 | 0.01791 |
| 33 | 0.01791 |
| 34 | 0.01791 |
| 35 | 0.01791 |
| 36 | 0.01893 |
| 37 | 0.01893 |
| 38 | 0.01893 |
| 39 | 0.01893 |

The grating cycle in the diffraction grating according to the present invention is not limited to those represented by expressions (1) to (4), and the grating cycle may be in proportion with $y$, $y^2$, y raised to a power, and polynomials thereof.

The material of substrate 13 and diffraction grating portion 12 needs only transmit the light beam having the wavelength used, and is formed of a material such as glass, silica, polymer. A diffraction grating may be formed by a method using electron beam drawing, 2P (Photo Polymerization), or photolithography. According to this embodiment, the photolithography (etching or reactive ion etching) is employed in view of precision and cost, and silica is used as the material.

Note that if the specification of the optics such as the number of beams, the focal distance/NA of the objective lens and collimator lens or the wavelength used changes, the invention may provide the same effects. The invention may be similarly applied to an optical disc apparatus using a sub beam as a servo signal for tracking or the like.

According to the present invention, the effect of the unequal-pitch diffraction grating is not limited to the application to an optical pickup using a hologram laser unit, but the effect is sufficiently provided if the diffraction grating is placed in a scattering or converging luminous flux.

As described above, the diffraction grating according to this embodiment may restrain the wave front aberration of not only the main beam but also higher order sub beams.

Third Embodiment

The construction of the multi-beam optical pickup to which the diffraction grating according to a third embodiment is applied is different from that of multi-beam optical pickup according to the first embodiment shown in FIG. 12 only in that nine light beams are directed to an optical recording medium and that the diffraction grating has a different construction. Therefore, similar construction and function will not be described again. Note that the diffraction grating according to this embodiment (hereinafter as the unequal pitch curved diffraction grating) will be denoted with reference numeral 8'.

The multi-beam optical pickup according to this embodiment is used up to the diffraction order of the ±fourth, and the zeroth-order diffracted light beam plus the ±fourth-order light beams, i.e., nine light beams altogether are directed to the optical recording medium. It is understood however that the number of the beams is not limited to 9.

A light beam emitted from semiconductor laser 7 comes into unequal-pitch curved diffraction grating 8' as a divergent luminous flux, is divided into 9 beams, the zeroth-order diffracted light beam B0 (main beam), the +first-order diffracted light beam B1(+) (one of sub beams, et seq), the (−) first-order diffracted light beam B1(−), the (+) second-order diffracted light beam B2(+), the (−) second-order diffracted light beam B2(−), the (+) third-order diffracted light beam B3(+), the (−) third-order diffracted light beam B3(−), the (+) fourth-order diffracted light beam B4 (+), and the (−) fourth-order diffracted light beam B4(−), passed through collimator lens 3 and objective lens 5 and collected on a disc 6.

The light reflected from disc 6 proceeds in the path opposite to the above-described path, passed through objective lens 5 and collimator lens 3, and light beams therefrom are diffracted by a hologram element 9 as the first-order diffracted light and let into internal light receiving portion 10 which detects RF, FES and RES signals as the first-order diffracted light beam at hologram element 9, so that each signal is read out.

In order to read out accurately and at high speed RF signals for the nine beams, in other words RF signals for the nine tracks, not only the spot size of main beam B0, but also the spot sizes of sub beams B1(+), B1(−), B2(+), B2(−), B3(+), B3(−), B4 (+) and B4(−) must be sufficiently limited.

However, as in this embodiment, semiconductor laser 7, unequal-pitch curved diffraction grating 8', hologram element 9 and internal light receiving portion 10 are integrally formed into a hologram pickup for the purpose of miniaturization/integration of the device, reducing the cost, and facilitating adjustment, the diffraction grating is placed in a divergent luminous flux, and therefore astigmatism or the like is caused to greatly change the aberration of the entire optical system as described above.

Herein, the inventors found that by the use of unequal pitch curved diffraction grating 8' having unequal fundamental grating cycles (the cycle of fundamental repetition of a diffraction grating within the surface of the diffraction grating and gratings having a curved shape, particularly by the use of such a grating that was smaller toward the central portion in the direction parallel to the direction of dividing a beam and larger toward the periphery, the aberration of the entire optical system could be restrained to a low level.

Figure 25:
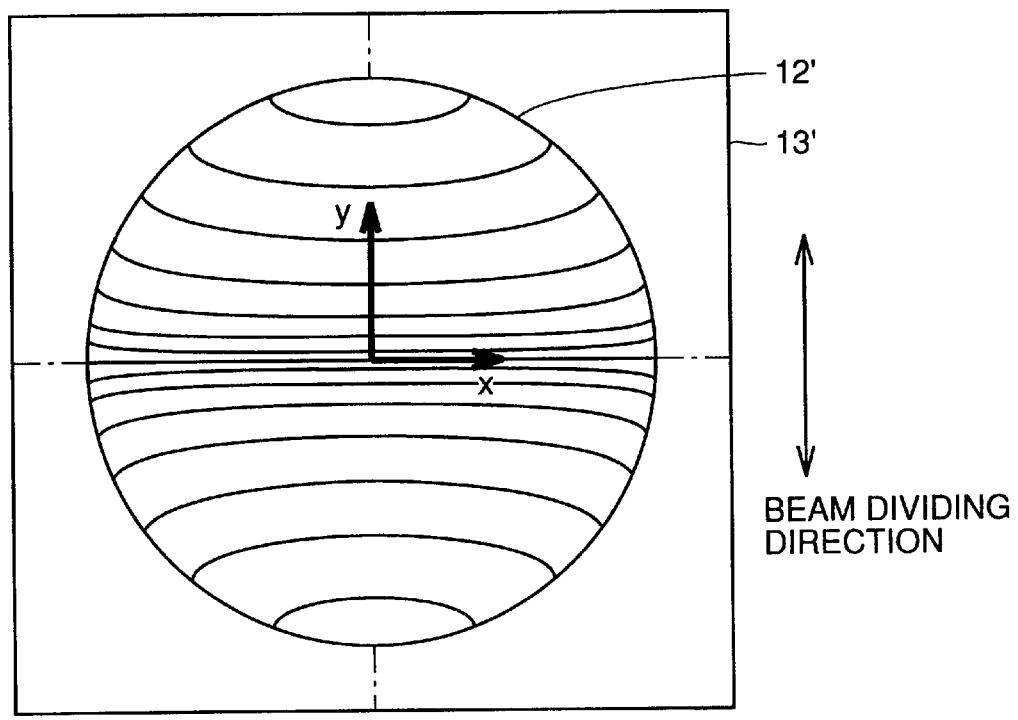
FIG. 25 is a top view of an unequal pitch curved diffraction grating according to a third embodiment of the present invention.
Figure 26:
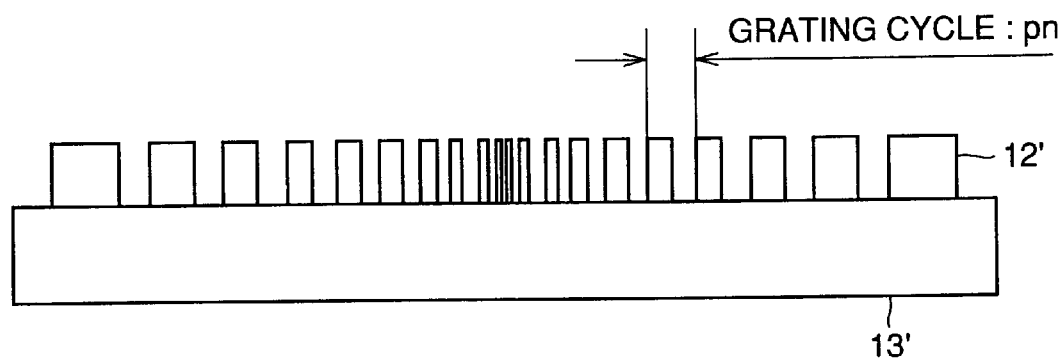
FIG. 26 is a cross sectional view of the unequal pitch curved diffraction grating according to the third embodiment.

FIG. 25 is a diagram showing the fundamental grating cycle of unequal-pitch curved type diffraction grating 8' according to the present embodiment viewed from the top. A grating groove is formed in a diffraction grating portion 12' in a substrate 13'. Note that in FIG. 25, the x-y coordinate system (y-axis: the first symmetric axis, x-axis: the second symmetric axis) is taken in a plane in which unequal pitch curved diffraction grating 8' is formed, the crossing of the unequal pitch curved diffraction grating 8' and the optical axis is taken as the origin, the direction parallel to the direction of dividing a beam is referred to as the y-direction, and the direction perpendicular to the beam dividing direction is referred to as the x-direction. FIG. 26 is a cross sectional view of unequal pitch curved diffraction grating 8' in FIG. 25 in the y-direction. In FIG. 26, the n-th fundamental grating cycle counted from the center of unequal pitch curved diffraction grating 8' is labeled pn. As shown, unequal pitch curved diffraction grating 8' according to the present embodiment has unequal fundamental cycles within the diffraction grating surface, and gratings are defined in a curved shape. The gratings are axisymmetric with respect to x=0 and y=0.

In the above construction, when the diffraction grating is placed in a divergent luminous flux, the fundamental grating cycle in the periphery of the luminous flux is set greater than that in the vicinity of the optical axis, so that the wave front aberration of the entire luminous flux could be restrained.

The irregular shape forming the fundamental grating cycle may have ridges 14-1, 14-2, 14-3 and 14-4 each in one cycle (one recess in each cycle), or may include three ridges and recesses in each cycle. Note however in each of the above cases, the grating cycle is defined using fundamental grating cycle pn as shown in FIGS. 27 and 28.

Figure 27:
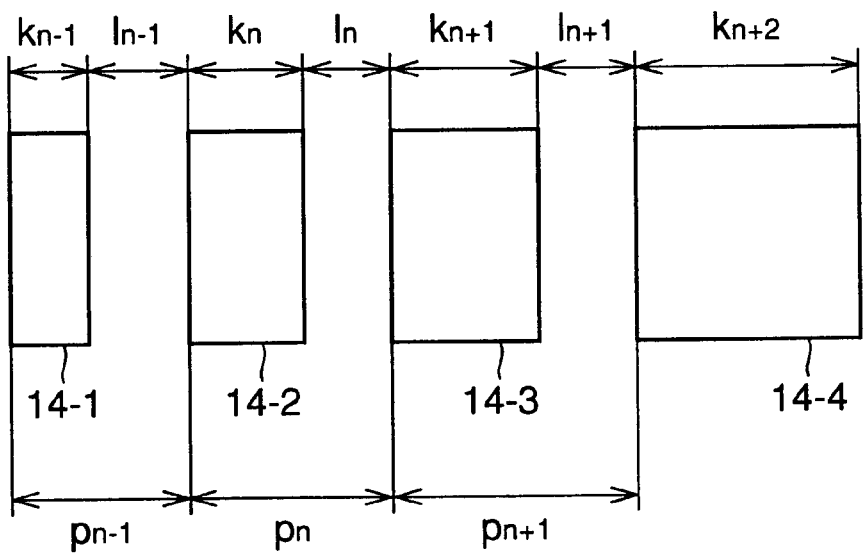
FIG. 27 is a representation for use in illustration of the shape of the unequal pitch curved diffraction grating according to the third embodiment.
Figure 28:
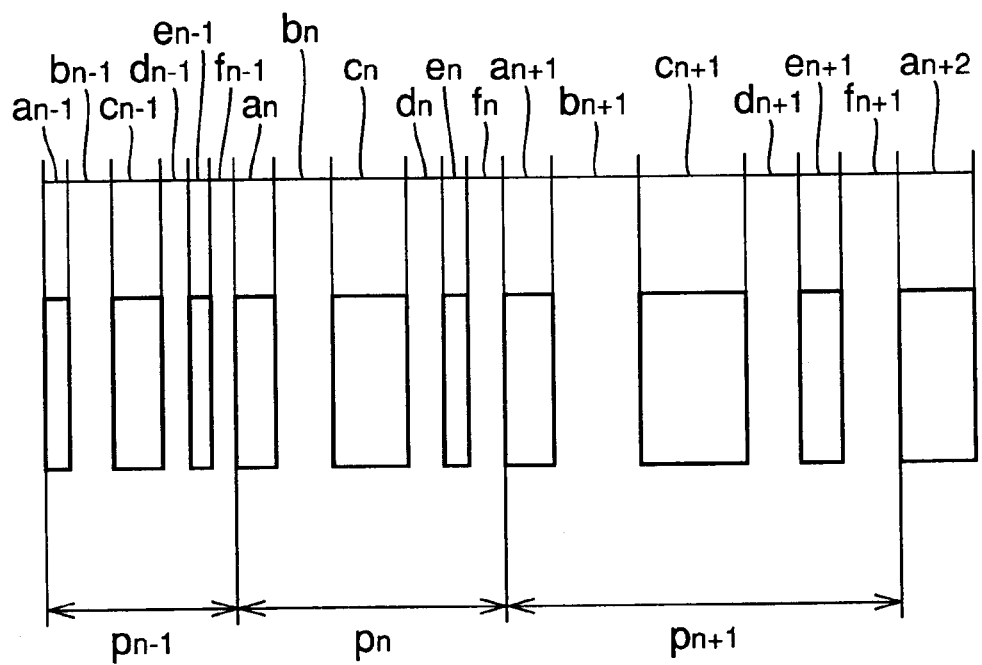
FIG. 28 is a representation for use in illustration of the shape of the unequal pith curved diffraction grating according to the third embodiment.

More specifically, sizes k, l, a, b, c, d, e and f to define the shape of ridges and recesses within the fundamental grating cycle in FIGS. 27 and 28 are determined by their ratios relative to p. These sizes are the same as those described in connection with the first embodiment, and therefore the description is not repeated.

As a result, the fundamental grating cycle of the diffraction grating according to the present invention determines the direction of the light beam as described above and refers to similar patterns having the same a/p, b/p, c/p and the like (so called "duty ratio"), any shape in design can be employed for the gratings within the fundamental cycle and still the same effect may be provided.

Specific examples of the unequal pitch curved diffraction grating and multi-beam optical pickup according to the present invention will be now described.

According to the present embodiment, the diffraction grating is optimized so that the aberration of the entire optical system shown in FIG. 12 may be reduced.

The inventors studied a number of fundamental cycles for an unequal pitch curved diffraction grating and found that a good result was obtained if the x and y coordinates of the position of each grating (x and y are coordinates in the directions shown in FIG. 25) satisfy the following expression:

$$f(x, y, n)=0$$

wherein n is the number of a grating counted from the center of the diffraction grating, n>0 if y>0 and n<0 if y<0, and f(x, y, n) consists of a polynomial including a term represented by the following expression:

$$a \cdot y - b \cdot x^2 \cdot y - c \cdot y^3 - d \cdot n$$

wherein a, b, c and d are constants with the same sign, and n=±1, ±2, ±3, . . . A specific numerical example (numerical example 4) for the position of the fundamental grating of the unequal pitch curved diffraction grating is given in Table 4. The fundamental grating position in Table 4 satisfies the following expression:

$$0.0415y - 0.00913x^2 \cdot y - 0.00750y^3 - 0.00065n = 0 \quad (5)$$

wherein x and y are coordinates shown in FIG. 25, and n is the number of a grating counted from the center of the diffraction grating.

Figure 29:
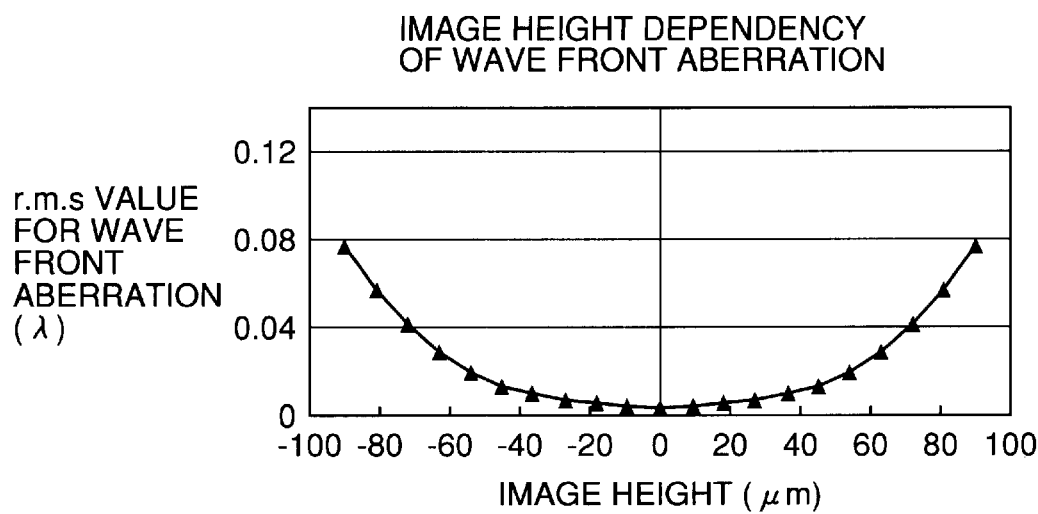
FIG. 29 is a graph showing the wave front aberration of the entire multi-beam optical pickup using an unequal pitch curved diffraction grating with a numerical example 4.
Figure 30:
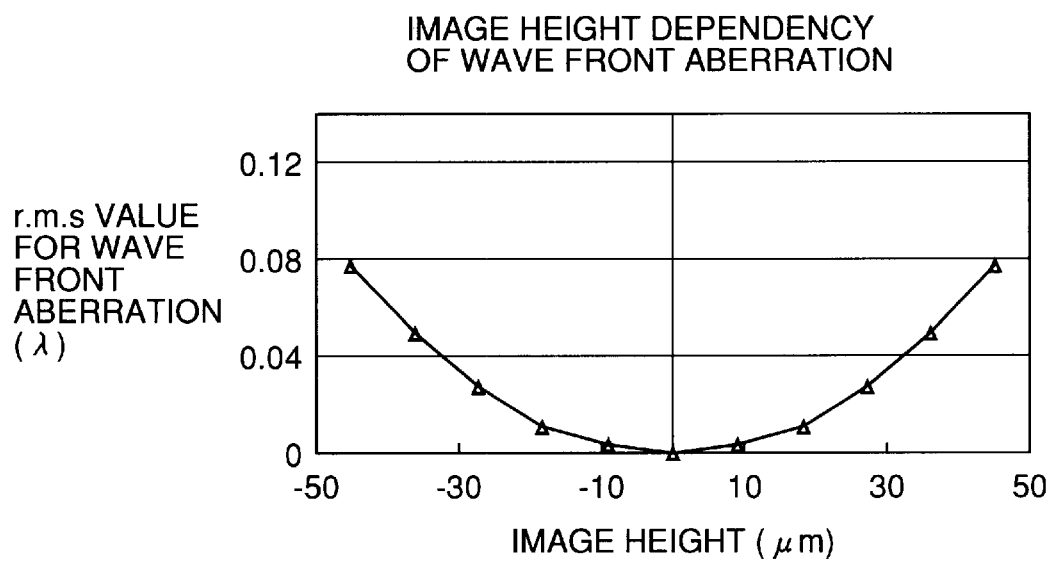
FIG. 30 is a graph showing the wave front aberration of the unequal pitch curved diffraction grating with numerical example 4.

B4 (+) and B4(−) on each disc are set to 9 μm, the relation between each beam and the wave front aberration is given in FIG. 29. The focal distance of objective lens 5 is 2.8 mm, the numerical aperture is 0.6, the numerical aperture of collimator lens 3 is 0.09, and the wavelength of a light source is 650 nm. The wave front aberration of only the diffraction grating is given in FIG. 30.

As can be seen from FIG. 29, using the unequal pitch curved diffraction grating with numerical example 4, the reference value of the wave front aberration of the entire

TABLE 4

| n | x = −0.4 mm | x = −0.3 mm | x = −0.2 mm | x = −0.1 mm | x = 0 mm | x = 0.1 mm | x = 0.2 mm | x = 0.3 mm | x = 0.4 mm |
|---|---|---|---|---|---|---|---|---|---|
| 1 | 0.01624 | 0.01598 | 0.01580 | 0.01570 | 0.01566 | 0.01570 | 0.01580 | 0.01598 | 0.01624 |
| 2 | 0.01624 | 0.01598 | 0.01581 | 0.01570 | 0.01567 | 0.01570 | 0.01581 | 0.01598 | 0.01624 |
| 3 | 0.01625 | 0.01599 | 0.01582 | 0.01571 | 0.01568 | 0.01571 | 0.01582 | 0.01599 | 0.01625 |
| 4 | 0.01626 | 0.01601 | 0.01583 | 0.01572 | 0.01569 | 0.01572 | 0.01583 | 0.01601 | 0.01626 |
| 5 | 0.01628 | 0.01603 | 0.01585 | 0.01574 | 0.01571 | 0.01574 | 0.01585 | 0.01603 | 0.01628 |
| 6 | 0.01631 | 0.01605 | 0.01587 | 0.01576 | 0.01573 | 0.01576 | 0.01587 | 0.01605 | 0.01631 |
| 7 | 0.01634 | 0.01608 | 0.01589 | 0.01579 | 0.01575 | 0.01579 | 0.01589 | 0.01608 | 0.01634 |
| 8 | 0.01637 | 0.01611 | 0.01593 | 0.01582 | 0.01578 | 0.01582 | 0.01593 | 0.01611 | 0.01637 |
| 9 | 0.01641 | 0.01615 | 0.01596 | 0.01585 | 0.01582 | 0.01585 | 0.01596 | 0.01615 | 0.01641 |
| 10 | 0.01646 | 0.01619 | 0.01600 | 0.01589 | 0.01586 | 0.01589 | 0.01600 | 0.01619 | 0.01646 |
| 11 | 0.01651 | 0.01623 | 0.01605 | 0.01593 | 0.01590 | 0.01593 | 0.01605 | 0.01623 | 0.01651 |
| 12 | 0.01656 | 0.01629 | 0.01610 | 0.01598 | 0.01595 | 0.01598 | 0.01610 | 0.01629 | 0.01656 |
| 13 | 0.01663 | 0.01635 | 0.01615 | 0.01604 | 0.01600 | 0.01604 | 0.01615 | 0.01635 | 0.01663 |
| 14 | 0.01669 | 0.01641 | 0.01621 | 0.01610 | 0.01606 | 0.01610 | 0.01621 | 0.01641 | 0.01669 |
| 15 | 0.01677 | 0.01648 | 0.01628 | 0.01616 | 0.01612 | 0.01616 | 0.01628 | 0.01648 | 0.01677 |
| 16 | 0.01685 | 0.01655 | 0.01635 | 0.01623 | 0.01619 | 0.01623 | 0.01635 | 0.01655 | 0.01685 |
| 17 | 0.01694 | 0.01664 | 0.01643 | 0.01631 | 0.01627 | 0.01631 | 0.01643 | 0.01664 | 0.01694 |
| 18 | 0.01703 | 0.01672 | 0.01651 | 0.01639 | 0.01635 | 0.01639 | 0.01651 | 0.01672 | 0.01703 |
| 19 | 0.01713 | 0.01682 | 0.01660 | 0.01648 | 0.01644 | 0.01648 | 0.01660 | 0.01682 | 0.01713 |
| 20 | 0.01724 | 0.01692 | 0.01670 | 0.01657 | 0.01653 | 0.01657 | 0.01670 | 0.01692 | 0.01724 |
| 21 | 0.01736 | 0.01703 | 0.01681 | 0.01667 | 0.01663 | 0.01667 | 0.01681 | 0.01703 | 0.01736 |
| 22 | 0.01749 | 0.01715 | 0.01692 | 0.01678 | 0.01674 | 0.01678 | 0.01692 | 0.01715 | 0.01749 |
| 23 | 0.01763 | 0.01728 | 0.01704 | 0.01690 | 0.01685 | 0.01690 | 0.01704 | 0.01728 | 0.01763 |
| 24 | 0.01778 | 0.01742 | 0.01717 | 0.01702 | 0.01698 | 0.01702 | 0.01717 | 0.01742 | 0.01778 |
| 25 | 0.01793 | 0.01756 | 0.01731 | 0.01716 | 0.01711 | 0.01716 | 0.01731 | 0.01756 | 0.01793 |
| 26 | 0.01810 | 0.01772 | 0.01745 | 0.01730 | 0.01725 | 0.01730 | 0.01745 | 0.01772 | 0.01810 |
| 27 | 0.01829 | 0.01789 | 0.01761 | 0.01745 | 0.01740 | 0.01745 | 0.01761 | 0.01789 | 0.01829 |
| 28 | 0.01848 | 0.01807 | 0.01778 | 0.01762 | 0.01756 | 0.01762 | 0.01778 | 0.01807 | 0.01848 |
| 29 | 0.01869 | 0.01826 | 0.01796 | 0.01779 | 0.01774 | 0.01779 | 0.01796 | 0.01826 | 0.01869 |
| 30 | 0.01892 | 0.01847 | 0.01816 | 0.01798 | 0.01792 | 0.01798 | 0.01816 | 0.01847 | 0.01892 |
| 31 | 0.01917 | 0.01869 | 0.01837 | 0.01818 | 0.01812 | 0.01818 | 0.01837 | 0.01869 | 0.01917 |
| 32 | 0.01943 | 0.01893 | 0.01859 | 0.01840 | 0.01834 | 0.01840 | 0.01859 | 0.01893 | 0.01943 |
| 33 | 0.01972 | 0.01919 | 0.01883 | 0.01863 | 0.01856 | 0.01863 | 0.01883 | 0.01919 | 0.01972 |
| 34 | 0.02002 | 0.01947 | 0.01910 | 0.01888 | 0.01881 | 0.01888 | 0.01910 | 0.01947 | 0.02002 |
| 35 | 0.02036 | 0.01977 | 0.01938 | 0.01915 | 0.01908 | 0.01915 | 0.01938 | 0.01977 | 0.02036 |
| 36 | 0.02073 | 0.02010 | 0.01968 | 0.01944 | 0.01936 | 0.01944 | 0.01968 | 0.02010 | 0.02073 |
| 37 | 0.02113 | 0.02046 | 0.02001 | 0.01976 | 0.01967 | 0.01976 | 0.02001 | 0.02046 | 0.02113 |
| 38 | 0.02157 | 0.02085 | 0.02037 | 0.02010 | 0.02001 | 0.02010 | 0.02037 | 0.02085 | 0.02157 |
| 39 | 0.02205 | 0.02127 | 0.02076 | 0.02047 | 0.02038 | 0.02047 | 0.02076 | 0.02127 | 0.02205 |

As can been seen from Table 4, in the fundamental grating of the unequal pitch curved diffraction grating according to the embodiment, the grating cycle in the y-direction where x is constant, in other words y(n+1) −y(n) increases as n increases.

The grating cycle in the x-direction is obtained from $y(x+\Delta x) - y(x) \equiv \Delta y(x)$ wherein $\Delta x = 0.1$ mm, which leads to the expression:

$$\Delta y(x=0) < \Delta y(x=0.1) < \Delta y(x=0.2) < \Delta y(x=0.3) < \ldots$$

and therefore the grating cycle increases as a function of the distance from the y-axis (i.e., x=0).

The unequal pitch curved diffraction grating with the above described numerical example 4 (the diffraction grating defined by expression (4)) will be now described when it is applied to the multi-beam optical pickup shown in FIG. 12.

In this case, when the beam interval among main beam B0, sub beams B1(+), B1(−), B2(+), B2(−), B3(+), B3(−), optical system up to the ±fourth-order diffracted light beam is not more than 0.07λ, and all the 9 beams can be reduced in the spot size to the limit of diffraction.

In terms of the allowable image height, the allowable image height for 0.07λ or lower is about 85 μm, which is greatly larger than the conventional value of 25 μm. As a result, as the image height is larger, the number of beams which can be formed in the allowable image height, when the beam pitch is constant, can be increased. In this case, the maximum available beam number is given as follows:

$$\text{Int } (85 \text{ μm}/9 \text{ μm}) = \text{Int } (9.44) = 9$$

Therefore, 9 higher-order beams are available on one side. As a result, 19 beams altogether including the zeroth-order beam satisfy a desired wave front aberration on both sides.

In practice, if the order of diffraction is increased, the intensity of each beam is reduced, and therefore in order to use all these 19 beams particularly in the field of optical pickups, the output of semiconductor laser 1 or the sensitivity of photosensor 10 should be improved, or other problems such as reducing loss by optical system should be solved. Herein, however, the maximum available diffraction order with respect to only the diffraction grating is suggested.

Furthermore, in view of tolerance in assembling, higher order diffracted light beams equal to or higher than the ±fourth-order diffracted light beams are available, and the number of beams formed by dividing may be increased from the conventional 3 to 9 or more.

As described above, the use of the unequal pitch curved diffraction grating allows diffracted light beams up to the ±fourth-order diffracted beam to have a wave front aberration significantly lower than the reference value $0.07\lambda$ of the wave front aberration, and all the nine beams can be reduced to the limit of diffraction, and the aberration is sufficiently small in higher-order beams, so that allowance for adjustment in assembling is increased.

Figure 31:
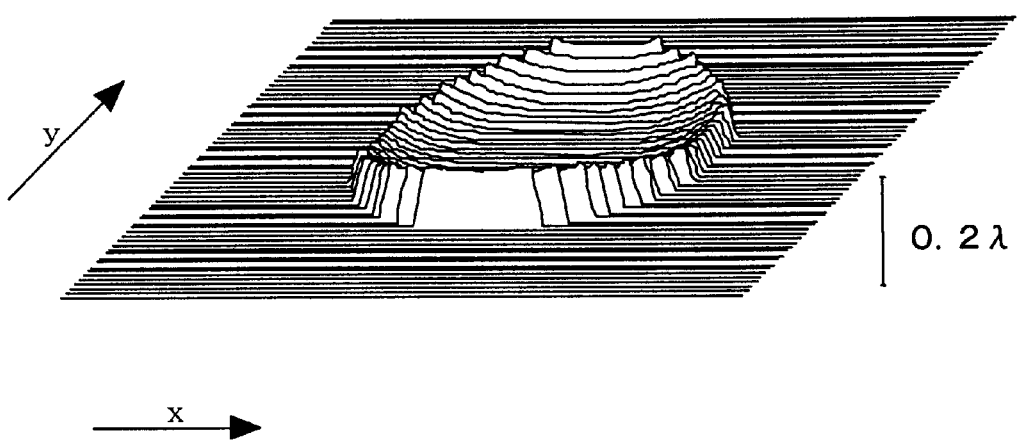
FIG. 31 is a graph showing the wave front aberration of the entire optical system excluding the unequal pitch curved diffraction grating with numerical example 4.
Figure 32:
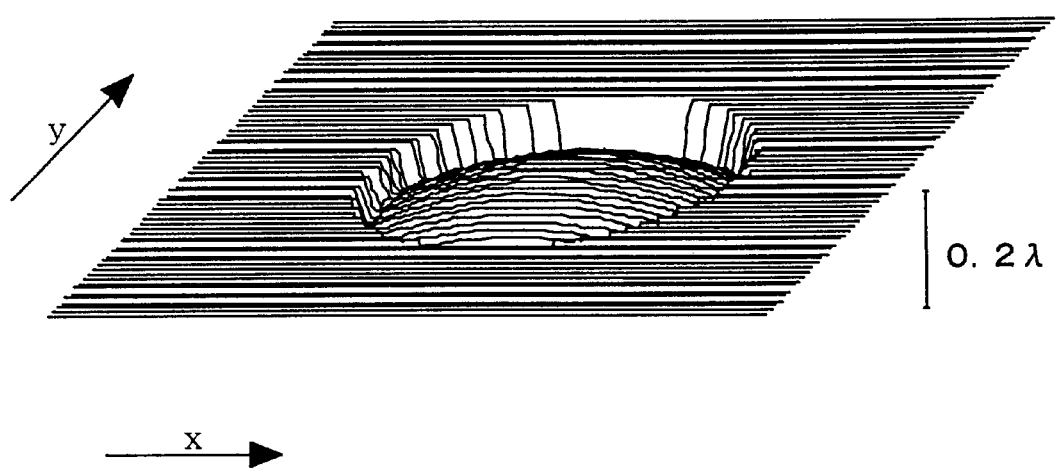
FIG. 32 is a graph showing the wave front aberration of only the unequal pitch curved diffraction grating with numerical example 4.
Figure 33:
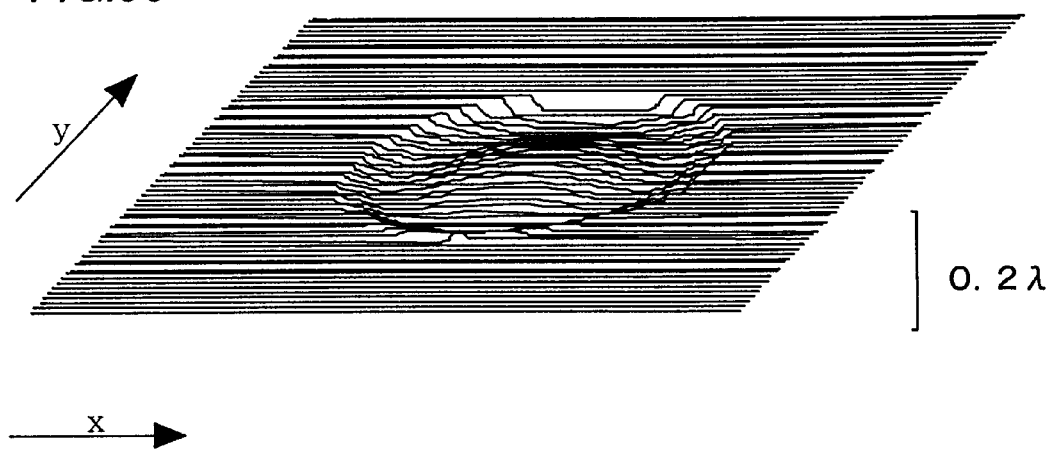
FIG. 33 is a graph showing the wave front aberration of the entire optical system including the unequal pitch curved diffraction grating with numerical example 4.

FIG. 31 is a representation showing the wave front aberration of the above optical system including only objective lens 5, collimator lens 3, disc 6 and the like, in other words the wave front aberration of the optical system without unequal pitch curved diffraction grating 8, FIG. 32 is a representation of the wave front aberration of only the unequal pitch curved diffraction grating, and FIG. 33 is a representation of the wave front aberration of the optical system including all the optics, objective lens 5, collimator lens 3, unequal pitch curved diffraction grating 8, disc 6 and the like.

As can be seen from comparison between FIG. 9 showing the aberration using the conventional equal pitch straight line type diffraction grating and FIG. 33 showing the aberration using the unequal pitch curved diffraction grating according to the present invention, the aberration of the entire optical system including the diffraction grating according to the present invention can be approximated almost to zero.

This is because the aberration in the opposite direction to the aberration generated from objective lens 55, collimator lens 33, disc 6 and the like is generated using the unequal pitch curved diffraction grating for correction.

This can be also seen from comparison between the aberration of unequal pitch curved diffraction grating 8 and the aberration of the entire optical system excluding unequal pitch curved diffraction grating 8, and the aberrations are in the opposite directions and have the same absolute value.

Thus, the direction of the aberration generated by the diffraction grating can be set in the opposite direction to the aberration generated from objective lens 55, collimator lens 33, disc 6 and the like, because the gratings have a curved shape. If the straight line is employed, the directions of the aberrations are the same, and therefore the aberration of the entire optical system including the diffraction grating cannot be smaller than the aberration of the entire optical system excluding the diffraction grating.

As in the foregoing, using the unequal pitch curved diffraction grating according to this embodiment, the aberration inherent to a flat plate including objective lens 5, collimator lens 3, a beam splitter and disc 6 can be corrected, so that the aberration of the entire optical system can be reduced.

The inventors studied about unequal pitch curved diffraction gratings represented by even higher order polynomials in addition to the unequal pitch curved diffraction grating represented by expression (5) (third-order polynomial). A numerical example is given in the following expressions (6) and (7):

$$0.0415y - 0.0079552x^2 \cdot y - 0.007486y^3 - 0.075442x^4 \cdot y + 0.0025119x^2 \cdot y^3 + 0.00080275y^5 - 0.00065n = 0 \quad (6)$$

and $$0.0415y - 0.0080325x^2 \cdot y - 0.0078917y^3 - 0.072322x^4 \cdot y + 0.0030523x^2 \cdot y^3 + 0.0028722y^5 - 0.0034719y^7 - 0.00065n = 0 \quad (7)$$

wherein x and y are coordinates shown in FIG. 25, and n is the number of a grating counted from the center of the unequal pitch curved diffraction grating.

Figure 34:
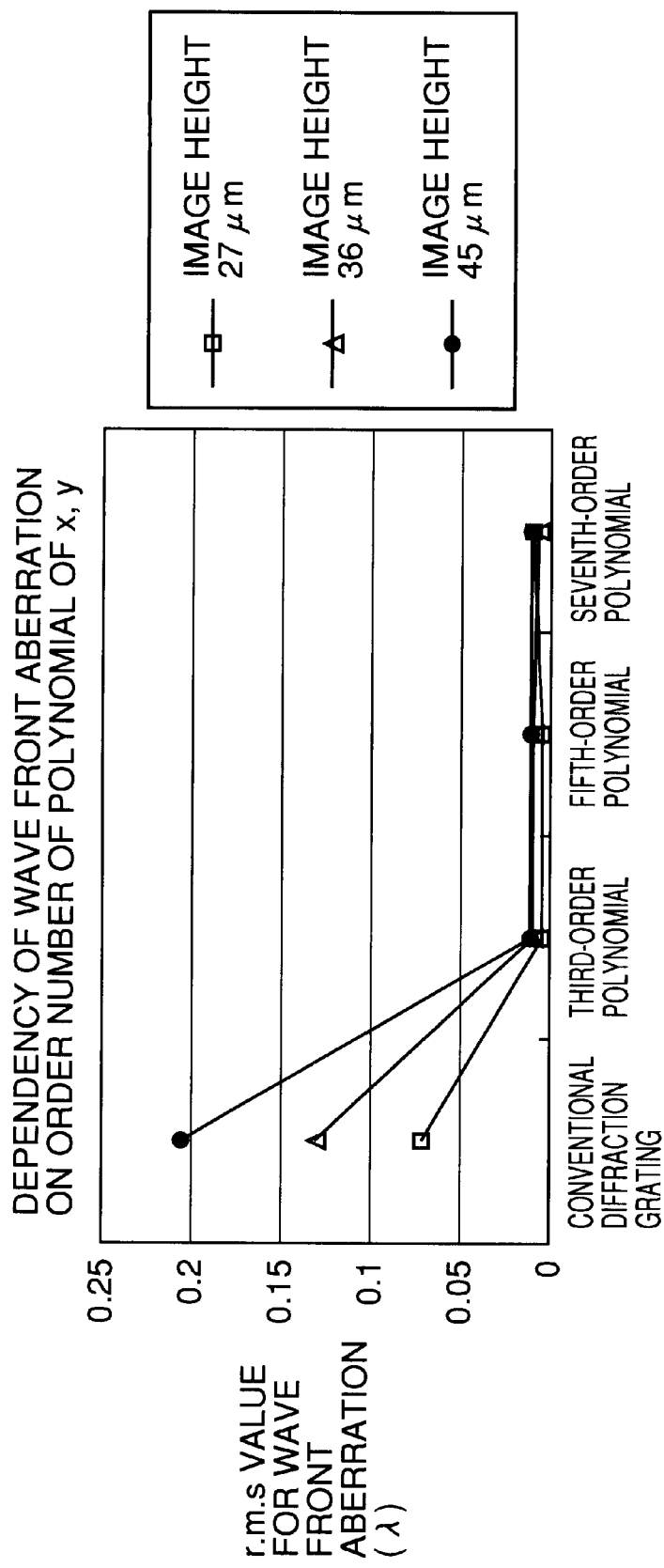
FIG. 34 is a graph showing the wave front aberration of the unequal pitch curved diffraction grating by polynomials of various orders according to the third embodiment.

FIG. 34 shows the wave front aberration of a grating in the position represented by the third-order polynomial of x and y represented by expression (5), the wave front aberration of a grating in the position represented by the fifth-order polynomial of x and y represented by expression (6), and the wave front aberration of a grating in the position represented by the seventh-order polynomial of x and y in comparison with a conventional diffraction grating (straight line equal pitch type), when the image height is 27 µm, 36 µm and 45 µm. In each of the image heights, the wave front aberration is greatly improved for any of the polynomials, but the wave front aberration by the fifth-order and seventh-order polynomials are not much different from the third-order polynomial. Therefore, necessary and sufficient effects can be obtained if the position of the grating is represented by the third-order polynomial of y in the unequal pitch curved diffraction grating according to this embodiment.

In this embodiment, if any optics such as objective lens 5 is changed, an optimum unequal pitch curved diffraction grating may be designed for the new optics. In this case, the fundamental principle and construction are the same while only the degree of increasing the grating cycle is different. As in the foregoing, by the multi-beam optical pickup according to the present embodiment, the aberration of not only the main beam but also higher-order sub beams can be restrained, the spot size can be sufficiently limited, and the jitter characteristic of each beam can be improved. Therefore, the number of beams can be increased, and reading at high speeds can be enabled.

Fourth Embodiment

This embodiment is optimized to reduce the aberration derived from the diffraction grating.

The inventors studied a number of fundamental grating cycles for an unequal pitch curved diffraction grating, and found that a good result was obtained when the x and y coordinates (x and y: coordinates in the directions shown in FIG. 25) in the position of each fundamental grating satisfied the following expression:

$$f(x, y, n) = 0$$

wherein n is the number of a grating counted from the center of the diffraction grating, n>0 if y>0 and n<0 if y<0, and f(x, y, n) consists of a polynomial including a term represented by the following expression:

$$a \cdot y - b \cdot x^2 \cdot y - c \cdot y^3 - d \cdot n$$

wherein a, b, c and d are constants with the same sign, and n=±1, ±2, ±3, . . .

A specific numerical example (numerical example 5) of the position of the fundamental grating for an unequal pitch curved diffraction grating is given in Table 5. The position of each fundamental grating in Table 5 is given by the following expression (8):

$$0.0415y - 0.00494x^2 \cdot y - 0.00487y^3 - 0.00065n = 0 \quad (8)$$

TABLE 5

| n | x = −0.4 mm | x = −0.3 mm | x = −0.2 mm | x = −0.1 mm | x = 0 mm | x = 0.1 mm | x = 0.2 mm | x = 0.3 mm | x = 0.4 mm |
|---|---|---|---|---|---|---|---|---|---|
| 1 | 0.01597 | 0.01583 | 0.01574 | 0.01568 | 0.01566 | 0.01568 | 0.01574 | 0.01583 | 0.01597 |
| 2 | 0.01597 | 0.01584 | 0.01574 | 0.01568 | 0.01567 | 0.01568 | 0.01574 | 0.01584 | 0.01597 |
| 3 | 0.01598 | 0.01584 | 0.01575 | 0.01569 | 0.01567 | 0.01569 | 0.01575 | 0.01584 | 0.01598 |
| 4 | 0.01598 | 0.01585 | 0.01575 | 0.01570 | 0.01568 | 0.01570 | 0.01575 | 0.01585 | 0.01598 |
| 5 | 0.01600 | 0.01586 | 0.01577 | 0.01571 | 0.01569 | 0.01571 | 0.01577 | 0.01586 | 0.01600 |
| 6 | 0.01601 | 0.01588 | 0.01578 | 0.01572 | 0.01570 | 0.01572 | 0.01578 | 0.01588 | 0.01601 |
| 7 | 0.01603 | 0.01589 | 0.01580 | 0.01574 | 0.01572 | 0.01574 | 0.01580 | 0.01589 | 0.01603 |
| 8 | 0.01605 | 0.01591 | 0.01582 | 0.01576 | 0.01574 | 0.01576 | 0.01582 | 0.01591 | 0.01605 |
| 9 | 0.01607 | 0.01594 | 0.01584 | 0.01578 | 0.01576 | 0.01578 | 0.01584 | 0.01594 | 0.01607 |
| 10 | 0.01610 | 0.01596 | 0.01586 | 0.01581 | 0.01579 | 0.01581 | 0.01586 | 0.01596 | 0.01610 |
| 11 | 0.01613 | 0.01599 | 0.01589 | 0.01583 | 0.01581 | 0.01583 | 0.01589 | 0.01599 | 0.01613 |
| 12 | 0.01616 | 0.01602 | 0.01592 | 0.01587 | 0.01585 | 0.01587 | 0.01592 | 0.01602 | 0.01616 |
| 13 | 0.01620 | 0.01606 | 0.01596 | 0.01590 | 0.01588 | 0.01590 | 0.01596 | 0.01606 | 0.01620 |
| 14 | 0.01624 | 0.01610 | 0.01600 | 0.01594 | 0.01592 | 0.01594 | 0.01600 | 0.01610 | 0.01624 |
| 15 | 0.01628 | 0.01614 | 0.01604 | 0.01598 | 0.01596 | 0.01598 | 0.01604 | 0.01614 | 0.01628 |
| 16 | 0.01633 | 0.01618 | 0.01608 | 0.01602 | 0.01600 | 0.01602 | 0.01608 | 0.01618 | 0.01633 |
| 17 | 0.01638 | 0.01623 | 0.01613 | 0.01607 | 0.01605 | 0.01607 | 0.01613 | 0.01623 | 0.01638 |
| 18 | 0.01644 | 0.01629 | 0.01618 | 0.01612 | 0.01610 | 0.01612 | 0.01618 | 0.01629 | 0.01644 |
| 19 | 0.01650 | 0.01634 | 0.01624 | 0.01617 | 0.01615 | 0.01617 | 0.01624 | 0.01634 | 0.01650 |
| 20 | 0.01656 | 0.01640 | 0.01629 | 0.01623 | 0.01621 | 0.01623 | 0.01629 | 0.01640 | 0.01656 |
| 21 | 0.01662 | 0.01647 | 0.01636 | 0.01629 | 0.01627 | 0.01629 | 0.01636 | 0.01647 | 0.01662 |
| 22 | 0.01669 | 0.01653 | 0.01642 | 0.01636 | 0.01633 | 0.01636 | 0.01642 | 0.01653 | 0.01669 |
| 23 | 0.01677 | 0.01661 | 0.01649 | 0.01642 | 0.01640 | 0.01642 | 0.01649 | 0.01661 | 0.01677 |
| 24 | 0.01685 | 0.01668 | 0.01657 | 0.01650 | 0.01648 | 0.01650 | 0.01657 | 0.01668 | 0.01685 |
| 25 | 0.01693 | 0.01676 | 0.01665 | 0.01658 | 0.01655 | 0.01658 | 0.01665 | 0.01676 | 0.01693 |
| 26 | 0.01702 | 0.01685 | 0.01673 | 0.01666 | 0.01664 | 0.01666 | 0.01673 | 0.01685 | 0.01702 |
| 27 | 0.01712 | 0.01694 | 0.01682 | 0.01675 | 0.01672 | 0.01675 | 0.01682 | 0.01694 | 0.01712 |
| 28 | 0.01722 | 0.01704 | 0.01691 | 0.01684 | 0.01681 | 0.01684 | 0.01691 | 0.01704 | 0.01722 |
| 29 | 0.01733 | 0.01714 | 0.01701 | 0.01694 | 0.01691 | 0.01694 | 0.01701 | 0.01714 | 0.01733 |
| 30 | 0.01744 | 0.01725 | 0.01712 | 0.01704 | 0.01701 | 0.01704 | 0.01712 | 0.01725 | 0.01744 |
| 31 | 0.01756 | 0.01736 | 0.01723 | 0.01715 | 0.01712 | 0.01715 | 0.01723 | 0.01736 | 0.01756 |
| 32 | 0.01768 | 0.01748 | 0.01734 | 0.01726 | 0.01724 | 0.01726 | 0.01734 | 0.01748 | 0.01768 |
| 33 | 0.01781 | 0.01761 | 0.01747 | 0.01738 | 0.01736 | 0.01738 | 0.01747 | 0.01761 | 0.01781 |
| 34 | 0.01796 | 0.01775 | 0.01760 | 0.01751 | 0.01748 | 0.01751 | 0.01760 | 0.01775 | 0.01796 |
| 35 | 0.01810 | 0.01789 | 0.01774 | 0.01765 | 0.01762 | 0.01765 | 0.01774 | 0.01789 | 0.01810 |
| 36 | 0.01826 | 0.01804 | 0.01788 | 0.01779 | 0.01776 | 0.01779 | 0.01788 | 0.01804 | 0.01826 |
| 37 | 0.01843 | 0.01820 | 0.01804 | 0.01794 | 0.01791 | 0.01794 | 0.01804 | 0.01820 | 0.01843 |
| 38 | 0.01861 | 0.01837 | 0.01820 | 0.01810 | 0.01807 | 0.01810 | 0.01820 | 0.01837 | 0.01861 |
| 39 | 0.01879 | 0.01854 | 0.01837 | 0.01827 | 0.01824 | 0.01827 | 0.01837 | 0.01854 | 0.01879 |

Figure 35:
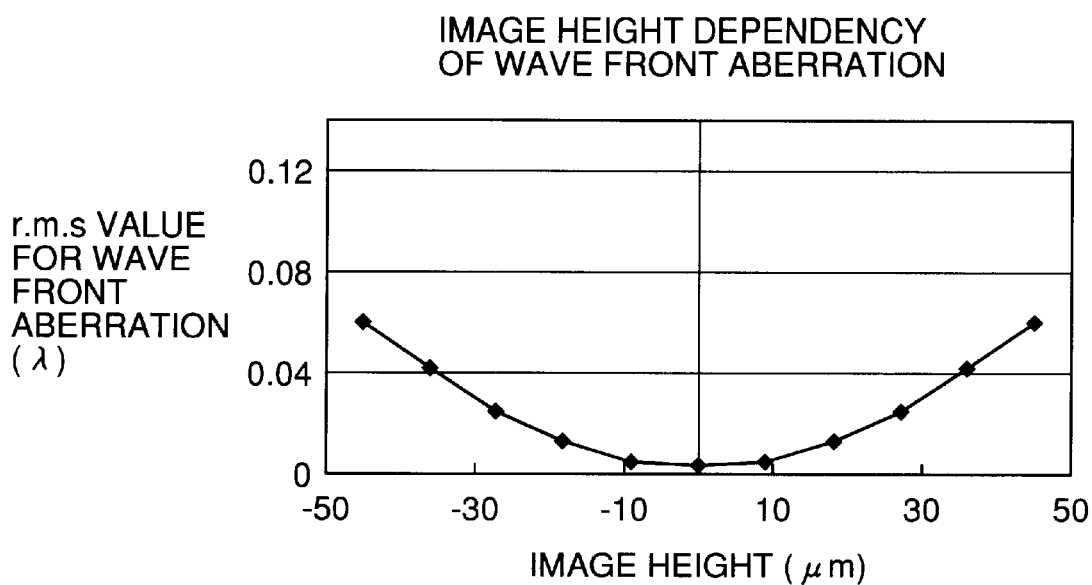
FIG. 35 is a graph showing the wave front aberration of the entire optical system including an equal pitch curved diffraction grating with a numerical example 5.
Figure 36:
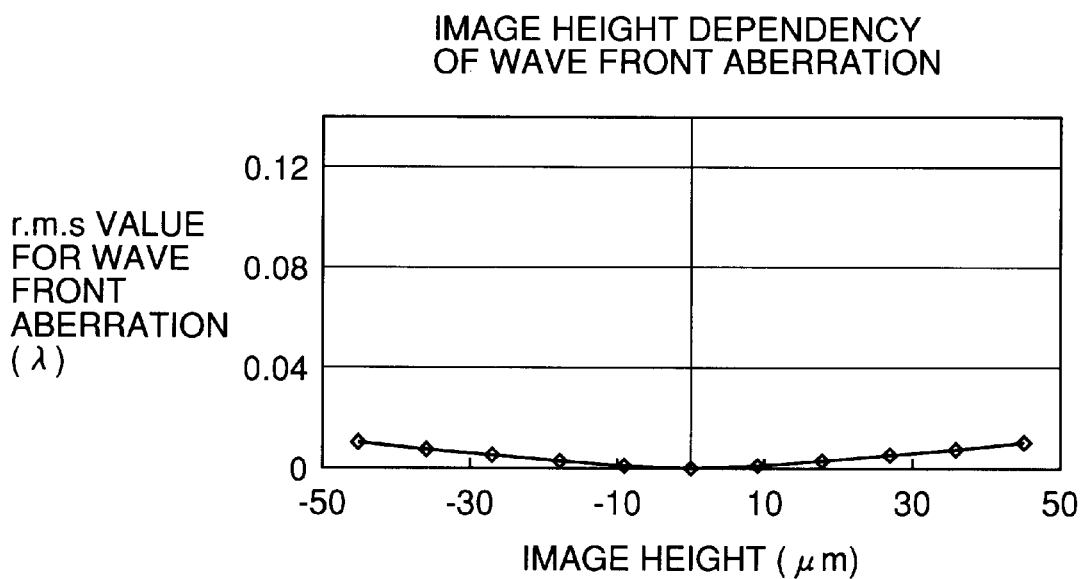
FIG. 36 is a graph showing the wave front aberration of only the unequal pitch curved diffraction grating with numerical example 5.

FIG. 35 shows the wave front aberration of the entire optical system with numerical example 5, while FIG. 36 shows the wave front aberration of only the unequal pitch curved diffraction grating. As shown in FIGS. 35 and 36, any of the aberrations is restrained to a low level, the wave front aberration is not more than 0.07λ for all the nine beams, and the allowable image height is greatly improved to be 42 μm.

When this diffraction grating is employed for the multi-beam optical pickup shown in FIG. 12, the maximum available number of beams, where each beam interval is 9 μm on disc 6, is represented by the following expression:

Int (42 μm/9 μm)=Int (4.66)=4 and four beams on each side, nine higher-order beams altogether may be used.

Furthermore, at least the ±second-order diffracted light beams are available even in view of tolerance in assembling, and therefore the number of beams formed by dividing can be increased from the conventional 3 to at least five.

This numerical example 5 is optimized to reduce the aberration of unequal pitch curved diffraction grating 8', and the same effects can be obtained for optics such as object lens 5, collimator lens 3 and the like having different aberration values.

Note that the materials of substrate 13' and diffraction grating portion 12' need only transmit the wavelength used in the unequal pitch curved diffraction grating according to the present invention described above, and a material such as glass, silica and polymer is employed. As for a method for forming the diffraction grading, a method using electron beam drawing, 2P or photolithography may be employed. According to this embodiment, photolithography is employed in view of precision and cost, reactive ion etching is employed, and silica is used as the material.

The effects of the invention are similarly provided if the specification of optics such as the number of beams, the focal distance/NA (numerical aperture) of objective lens 5 and collimator lens 3, and the wavelength used. Furthermore, the unequal pitch curved diffraction grating according to the present invention can be used in an optical disc to/from which a signal is written/read with a single beam and which uses a sub beam as a servo signal for tracking and the like in addition to the multi-beam optical pickup described in conjunction with this embodiment.

Furthermore, in the third and fourth embodiments, the grating cycles change gradually in the numerical examples, but if the diffraction grating with the numerical example in Table 6 for example is divided into a plurality of regions, the grating cycle is set to be the same within a region and change among the regions, still sufficient effects are provided.

TABLE 6

| n | x = −0.4 mm | x = −0.3 mm | x = −0.2 mm | x = −0.1 mm | x = 0 mm | x = 0.1 mm | x = 0.2 mm | x = 0.3 mm | x = 0.4 mm |
|---|---|---|---|---|---|---|---|---|---|
| 1 | 0.01597 | 0.01583 | 0.01574 | 0.01568 | 0.01566 | 0.01568 | 0.01574 | 0.01583 | 0.01597 |
| 2 | 0.01597 | 0.01583 | 0.01574 | 0.01568 | 0.01566 | 0.01568 | 0.01574 | 0.01583 | 0.01597 |
| 3 | 0.01597 | 0.01583 | 0.01574 | 0.01568 | 0.01566 | 0.01568 | 0.01574 | 0.01583 | 0.01597 |
| 4 | 0.01597 | 0.01583 | 0.01574 | 0.01568 | 0.01566 | 0.01568 | 0.01574 | 0.01583 | 0.01597 |
| 5 | 0.01597 | 0.01583 | 0.01574 | 0.01568 | 0.01566 | 0.01568 | 0.01574 | 0.01583 | 0.01597 |
| 6 | 0.01601 | 0.01588 | 0.01578 | 0.01572 | 0.01570 | 0.01572 | 0.01578 | 0.01588 | 0.01601 |
| 7 | 0.01601 | 0.01588 | 0.01578 | 0.01572 | 0.01570 | 0.01572 | 0.01578 | 0.01588 | 0.01601 |
| 8 | 0.01601 | 0.01588 | 0.01578 | 0.01572 | 0.01570 | 0.01572 | 0.01578 | 0.01588 | 0.01601 |
| 9 | 0.01601 | 0.01588 | 0.01578 | 0.01572 | 0.01570 | 0.01572 | 0.01578 | 0.01588 | 0.01601 |
| 10 | 0.01601 | 0.01588 | 0.01578 | 0.01572 | 0.01570 | 0.01572 | 0.01578 | 0.01588 | 0.01601 |
| 11 | 0.01613 | 0.01599 | 0.01589 | 0.01583 | 0.01581 | 0.01583 | 0.01589 | 0.01599 | 0.01613 |
| 12 | 0.01613 | 0.01599 | 0.01589 | 0.01583 | 0.01581 | 0.01583 | 0.01589 | 0.01599 | 0.01613 |
| 13 | 0.01613 | 0.01599 | 0.01589 | 0.01583 | 0.01581 | 0.01583 | 0.01589 | 0.01599 | 0.01613 |
| 14 | 0.01613 | 0.01599 | 0.01589 | 0.01583 | 0.01581 | 0.01583 | 0.01589 | 0.01599 | 0.01613 |
| 15 | 0.01613 | 0.01599 | 0.01589 | 0.01583 | 0.01581 | 0.01583 | 0.01589 | 0.01599 | 0.01613 |
| 16 | 0.01633 | 0.01618 | 0.01608 | 0.01602 | 0.01600 | 0.01602 | 0.01608 | 0.01618 | 0.01633 |
| 17 | 0.01633 | 0.01618 | 0.01608 | 0.01602 | 0.01600 | 0.01602 | 0.01608 | 0.01618 | 0.01633 |
| 18 | 0.01633 | 0.01618 | 0.01608 | 0.01602 | 0.01600 | 0.01602 | 0.01608 | 0.01618 | 0.01633 |
| 19 | 0.01633 | 0.01618 | 0.01608 | 0.01602 | 0.01600 | 0.01602 | 0.01608 | 0.01618 | 0.01633 |
| 20 | 0.01633 | 0.01618 | 0.01608 | 0.01602 | 0.01600 | 0.01602 | 0.01608 | 0.01618 | 0.01633 |
| 21 | 0.01662 | 0.01647 | 0.01636 | 0.01629 | 0.01627 | 0.01629 | 0.01636 | 0.01647 | 0.01662 |
| 22 | 0.01662 | 0.01647 | 0.01636 | 0.01629 | 0.01627 | 0.01629 | 0.01636 | 0.01647 | 0.01662 |
| 23 | 0.01662 | 0.01647 | 0.01636 | 0.01629 | 0.01627 | 0.01629 | 0.01636 | 0.01647 | 0.01662 |
| 24 | 0.01662 | 0.01647 | 0.01636 | 0.01629 | 0.01627 | 0.01629 | 0.01636 | 0.01647 | 0.01662 |
| 25 | 0.01662 | 0.01647 | 0.01636 | 0.01629 | 0.01627 | 0.01629 | 0.01636 | 0.01647 | 0.01662 |
| 26 | 0.01702 | 0.01685 | 0.01673 | 0.01666 | 0.01664 | 0.01666 | 0.01673 | 0.01685 | 0.01702 |
| 27 | 0.01702 | 0.01685 | 0.01673 | 0.01666 | 0.01664 | 0.01666 | 0.01673 | 0.01685 | 0.01702 |
| 28 | 0.01702 | 0.01685 | 0.01673 | 0.01666 | 0.01664 | 0.01666 | 0.01673 | 0.01685 | 0.01702 |
| 29 | 0.01702 | 0.01685 | 0.01673 | 0.01666 | 0.01664 | 0.01666 | 0.01673 | 0.01685 | 0.01702 |
| 30 | 0.01702 | 0.01685 | 0.01673 | 0.01666 | 0.01664 | 0.01666 | 0.01673 | 0.01685 | 0.01702 |
| 31 | 0.01756 | 0.01736 | 0.01723 | 0.01715 | 0.01712 | 0.01715 | 0.01723 | 0.01736 | 0.01756 |
| 32 | 0.01756 | 0.01736 | 0.01723 | 0.01715 | 0.01712 | 0.01715 | 0.01723 | 0.01736 | 0.01756 |
| 33 | 0.01756 | 0.01736 | 0.01723 | 0.01715 | 0.01712 | 0.01715 | 0.01723 | 0.01736 | 0.01756 |
| 34 | 0.01756 | 0.01736 | 0.01723 | 0.01715 | 0.01712 | 0.01715 | 0.01723 | 0.01736 | 0.01756 |
| 35 | 0.01756 | 0.01736 | 0.01723 | 0.01715 | 0.01712 | 0.01715 | 0.01723 | 0.01736 | 0.01756 |
| 36 | 0.01826 | 0.01804 | 0.01788 | 0.01779 | 0.01776 | 0.01779 | 0.01788 | 0.01804 | 0.01826 |
| 37 | 0.01826 | 0.01804 | 0.01788 | 0.01779 | 0.01776 | 0.01779 | 0.01788 | 0.01804 | 0.01826 |
| 38 | 0.01826 | 0.01804 | 0.01788 | 0.01779 | 0.01776 | 0.01779 | 0.01788 | 0.01804 | 0.01826 |
| 39 | 0.01826 | 0.01804 | 0.01788 | 0.01779 | 0.01776 | 0.01779 | 0.01788 | 0.01804 | 0.01826 |

The grating curve in unequal pitch curved diffraction grating 8' according to the present invention is not limited to those represented by expressions (5) to (8), and the grating cycle may change at a constant change rate or may be in proportion with y, $y^2$, x and y raised to a power and a polynomial thereof Furthermore, the effects of the unequal pitch curved diffraction grating according to the invention is not limited to such a optical pickup using a hologram laser unit and the effects can be provided when a diffraction grating is placed in a scattering or converging luminous flux.

With the diffraction grating according to the present invention, the wave front aberration of not only the main beam but also higher-order sub beams may be restrained.

If the diffraction grating is formed to generate a wave front aberration in the opposite direction to the direction of the wave front aberration generated by the optics of the optical pickup or the recording medium, the wave front aberration of not only the main beam but also the sub beams may be restrained, and the jitter characteristic of each beam may be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A diffraction grating for generating a plurality of beams, comprising a plurality of gratings, said plurality of gratings being formed to have an axis of symmetry perpendicular to a direction in which a beam is divided on a surface of said diffraction grating for generating a plurality of beams, and including at least two gratings having different fundamental cycles, wherein said plurality of gratings are composed of a series of straight lines that are oriented parallel to the axis of symmetry and arranged at an increased spacing from the middle of the diffraction grating toward an outward periphery of the diffraction grating.

2. The diffraction grating according to claim 1, wherein said plurality of gratings has a fundamental cycle which increases as a function of a distance from said axis of symmetry.

3. The diffraction grating according to claim 1, wherein the following expression is satisfied:

$f(y, n) = a \cdot y - b \cdot y^3 - c \cdot n = 0$ wherein the direction perpendicular to said axis of symmetry is taken as a coordinate y-axis, a grating number counted from a grating close to said axis of symmetry n=±1, ±2, ±3, . . . , and a, b and c are constants with the same sign.

4. A diffraction grating for generating a plurality of beams, comprising a plurality of gratings being formed to have an axis of symmetry perpendicular to a direction in which a beam is divided on a surface of said diffraction grating and being oriented parallel to the axis of symmetry, wherein said plurality of gratings are divided into a plurality of regions and each region comprises at least two gratings, and wherein a fundamental cycle for each region changes in a non-continuous step-wise fashion.

5. A multi-beam optical pickup, comprising:
a semiconductor laser;
a diffraction grating for generating a plurality of beams, said diffraction grating including a plurality of gratings having an axis of symmetry perpendicular to a direction in which a beam is divided and at least two gratings with different fundamental cycles, wherein said plurality of gratings are composed of a series of straight lines that are oriented parallel to the axis of symmetry and arranged at an increased spacing from the middle of the diffraction grating toward an outward periphery of the diffraction grating;
a hologram element for transmitting a light beam transmitted through said diffraction grating for generating a plurality of beams and reflected from a recording medium; and
an internal light receiving portion for receiving the light beam transmitted through said hologram element.

6. The multi-beam optical pickup according to claim 5, wherein said plurality of gratings have a fundamental cycle which increases as a function of a distance from said axis of symmetry.

7. The multi-beam optical pickup according to claim 5, wherein the following expression is satisfied:

$$f(y, n) = a \cdot y - b \cdot y^3 - c \cdot n = 0$$

wherein the direction perpendicular to said axis of symmetry is taken as a y-coordinate axis, a grating number counted from a grating close to said axis of symmetry n=±1, ±2; ±3, . . . , and a, b and c are constants with the same sign.

8. An unequal-pitch diffraction grating comprising a planar surface with a plurality of grating lines thereon, said grating lines parallel to one another and stretching across a substantial portion of said planar surface,
wherein each of said grating lines is oriented such that its axis of symmetry is perpendicular to a direction in which a beam impinging on said planar surface is divided, and
wherein each grating line has a fundamental cycle, said fundamental cycle being smaller at locations substantially near the center of the planar surface and increasing toward an outer periphery of said planar surface so that front wave aberration of main and sub beams impinging on said diffraction grating are restrained.

9. The diffraction grating according to claim 8, wherein a fundamental cycle of said grating lines increases as a function of distance from the center of said planar surface.

10. The diffraction grating according to claim 8, wherein a fundamental cycle of said grating lines changes step-wise.

11. The diffraction grating according to claim 8, wherein the fundamental cycle is set to be greater at the periphery of the luminous flux near edges of the diffraction grating than near the center at a crossing of the diffraction grating and the optical axis, thereby reducing overall luminous flux of the diffraction grating.

12. The diffraction grating according to claim 8, wherein spaces between pairs of parallel grating lines increase in width from the center of the planar surface toward an edge thereof.

13. A multi-beam optical pickup, comprising:
a semiconductor laser;
a diffraction grating for generating a plurality of beams, said diffraction grating including a plurality of gratings having an axis of symmetry perpendicular to a direction in which a beam is divided and oriented parallel to the axis of symmetry, wherein said plurality of gratings are divided into a plurality of regions and each region comprises at least two gratings, and wherein a fundamental cycle for each region changes in a non-continuous step-wise fashion;
a hologram element for transmitting a light beam transmitted through said diffraction grating for generating a plurality of beams and reflected from a recording medium; and
an internal light receiving portion for receiving the light beam transmitted through said hologram element.

* * * * *